Aug. 8, 1967 C. L. CRAIG 3,334,550
APPARATUS FOR AND METHOD OF MAKING HANDLES
AND APPLYING SAME TO A BAG
Filed July 23, 1964 13 Sheets-Sheet 1
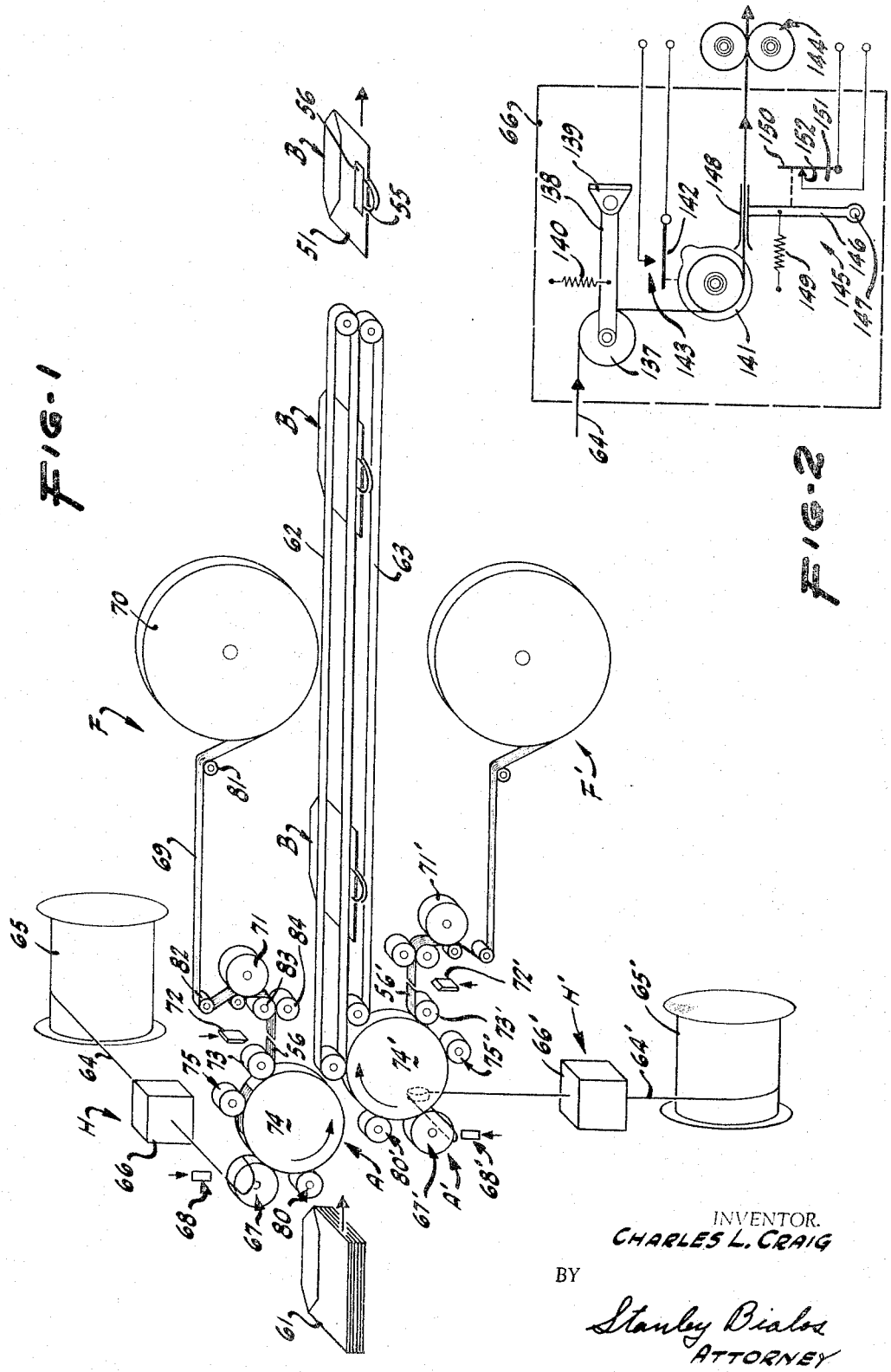
INVENTOR.
CHARLES L. CRAIG
BY
Stanley Bialos
ATTORNEY

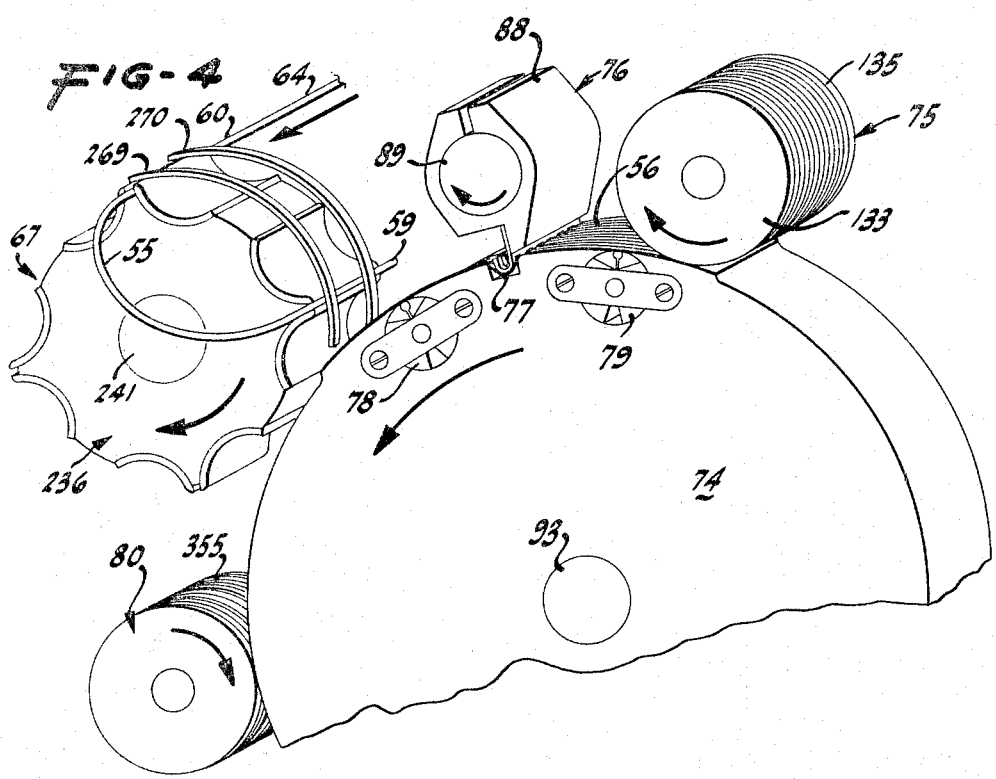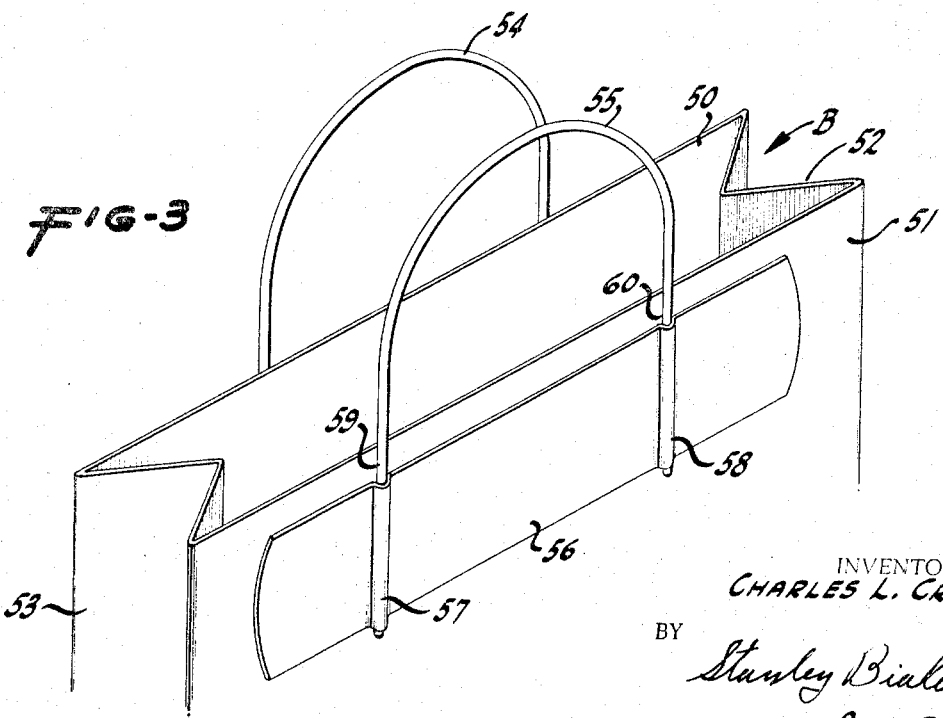

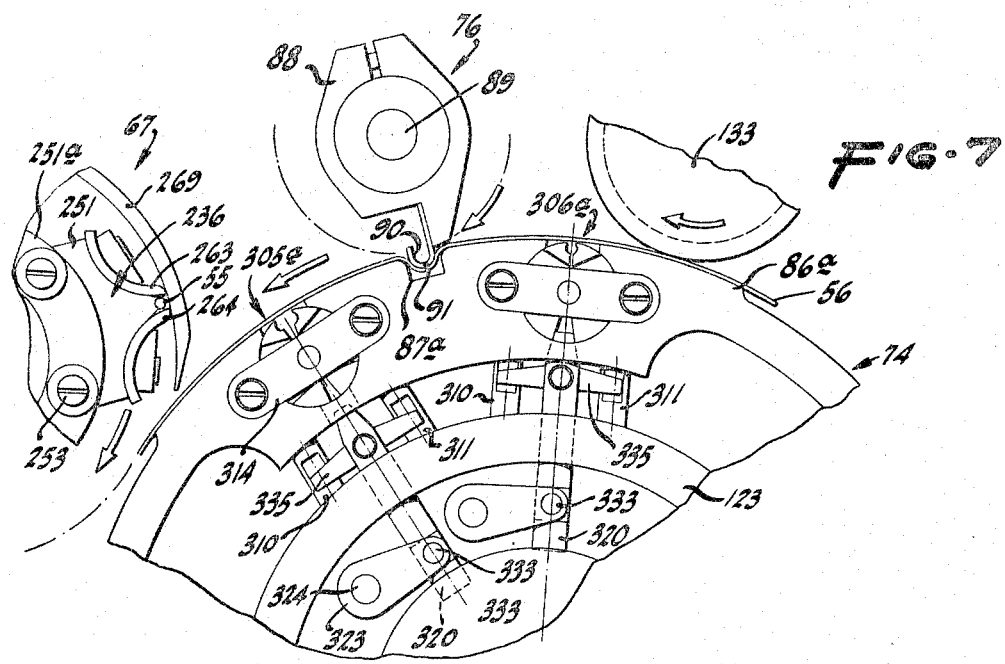
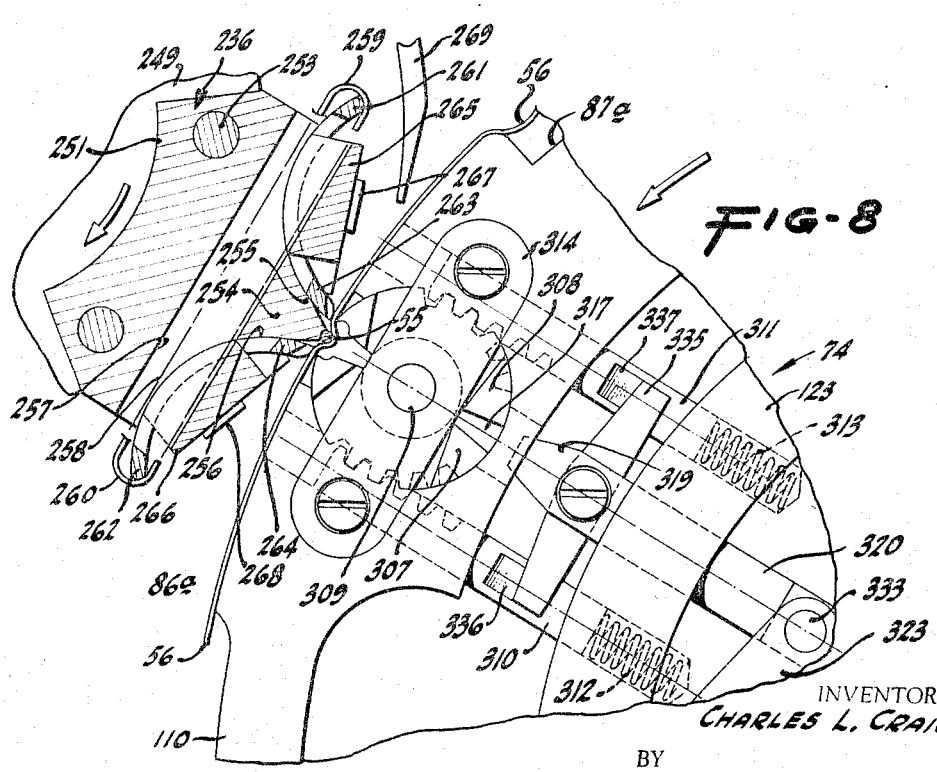

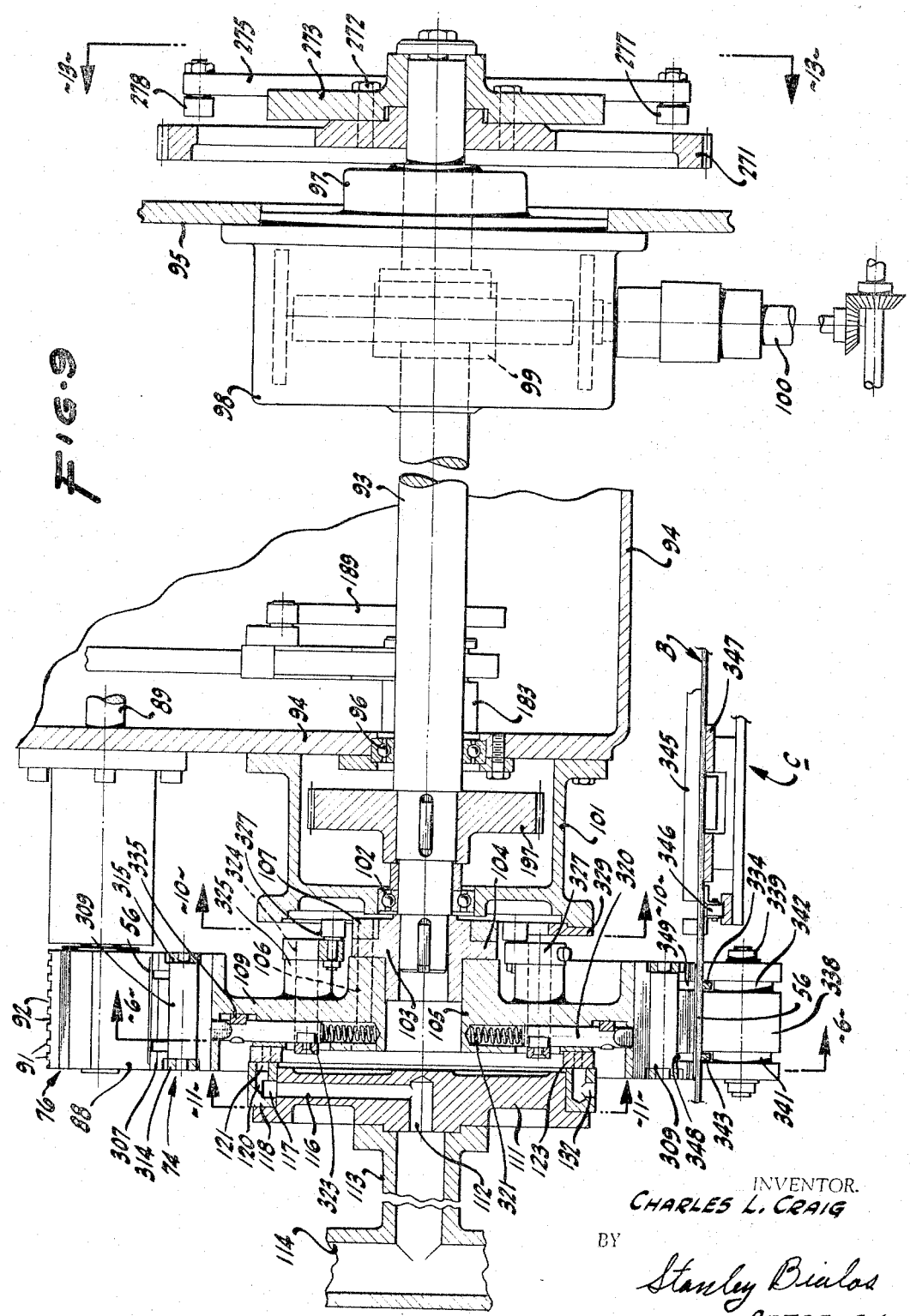

Aug. 8, 1967  
C. L. CRAIG  
3,334,550  
APPARATUS FOR AND METHOD OF MAKING HANDLES AND APPLYING SAME TO A BAG  
Filed July 23, 1964  
13 Sheets-Sheet 7
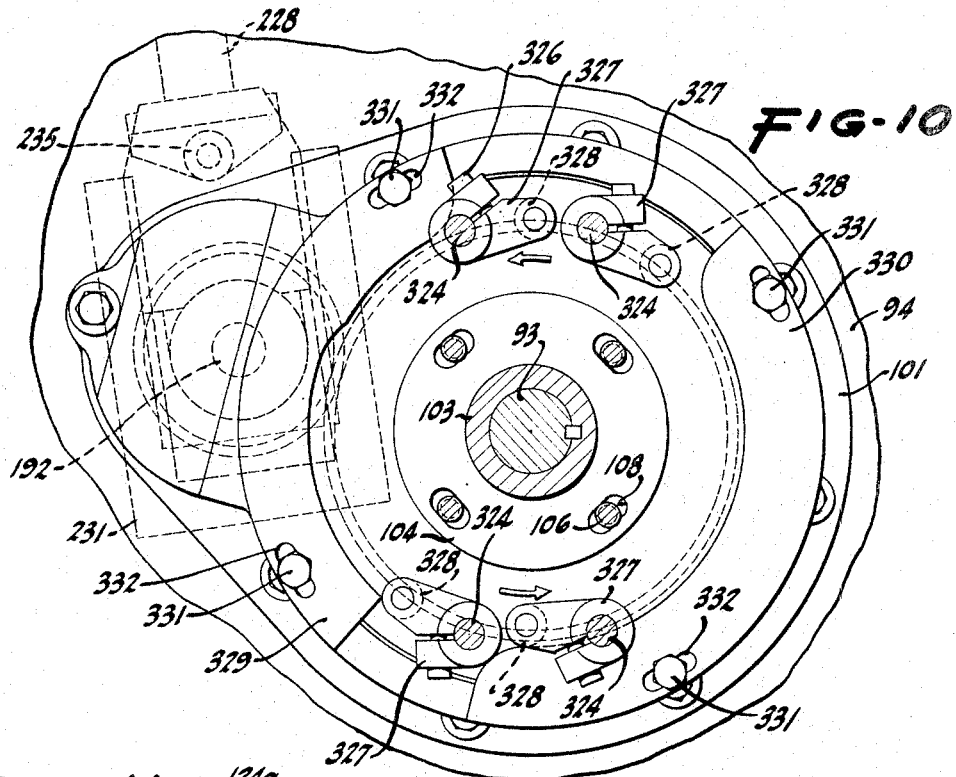
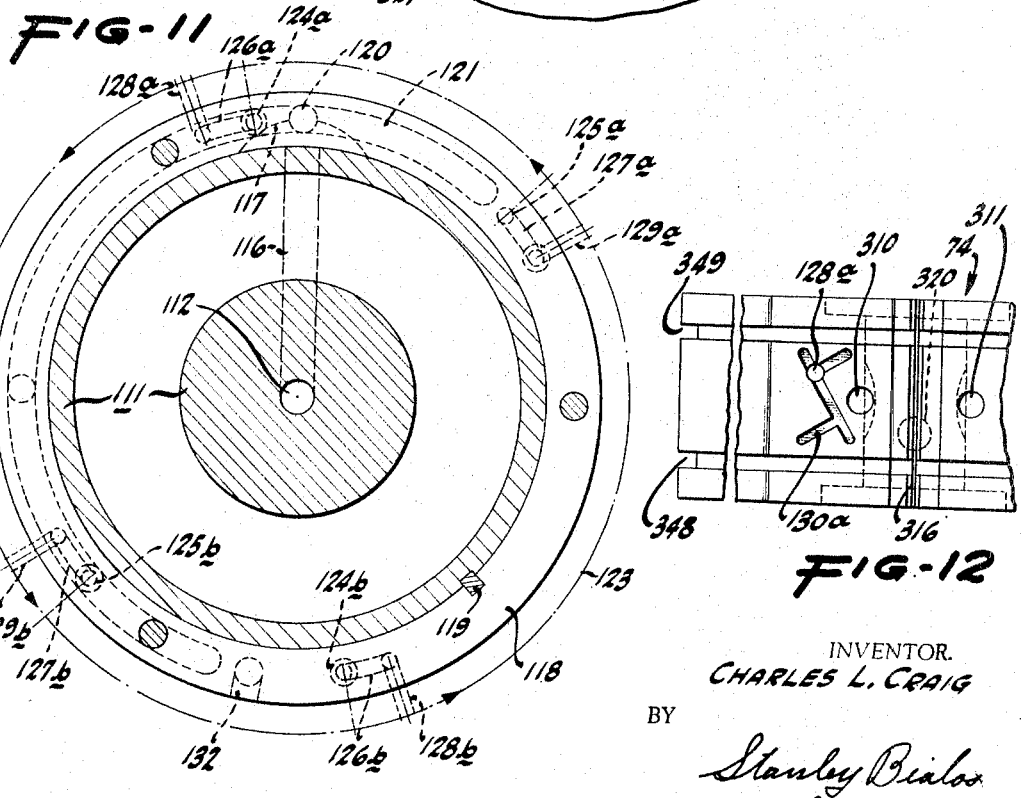
INVENTOR.
CHARLES L. CRAIG
BY
Stanley Bialos
ATTORNEY Aug. 8, 1967  C. L. CRAIG  3,334,550
APPARATUS FOR AND METHOD OF MAKING HANDLES
AND APPLYING SAME TO A BAG
Filed July 23, 1964  13 Sheets-Sheet 8

INVENTOR.
CHARLES L. CRAIG
BY
Stanley Bialos
ATTORNEY

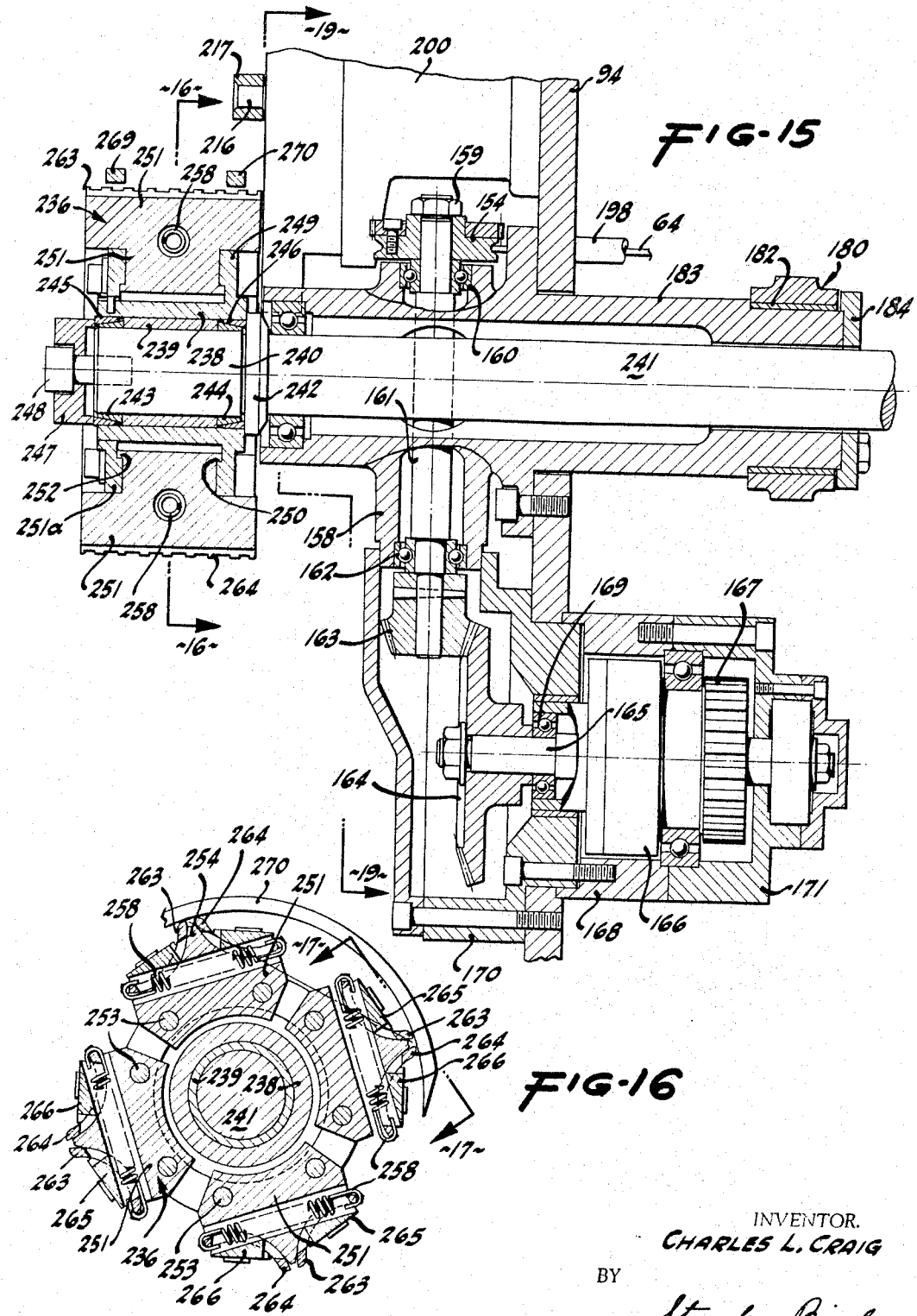

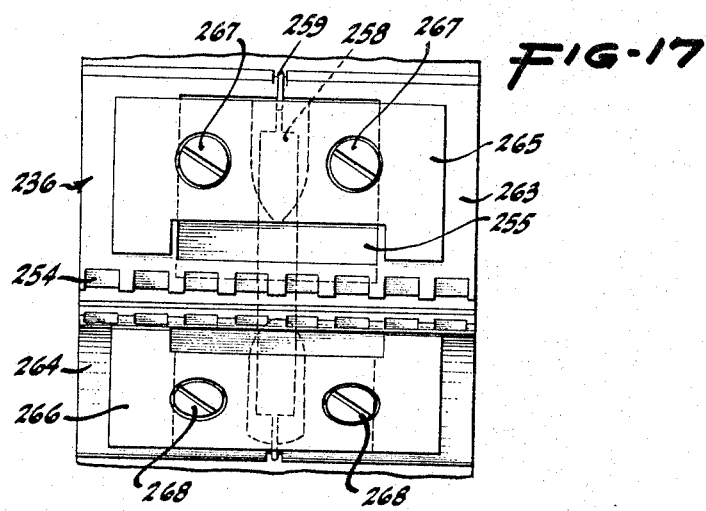
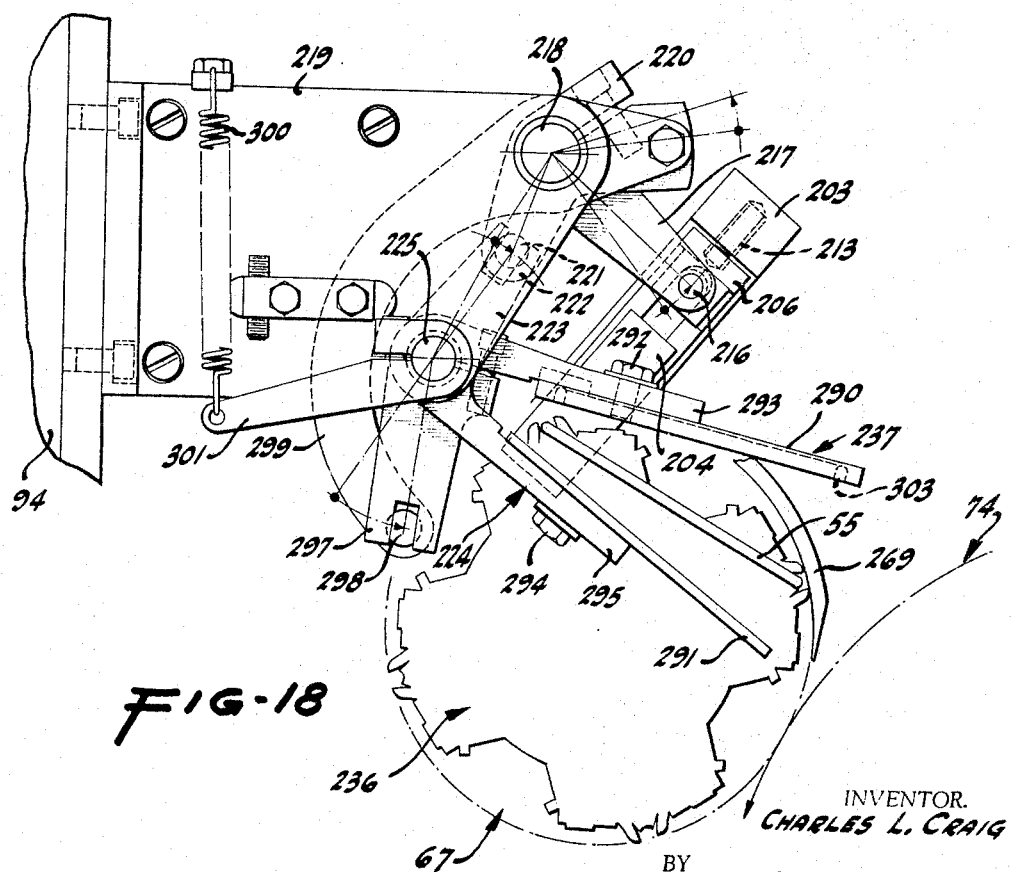

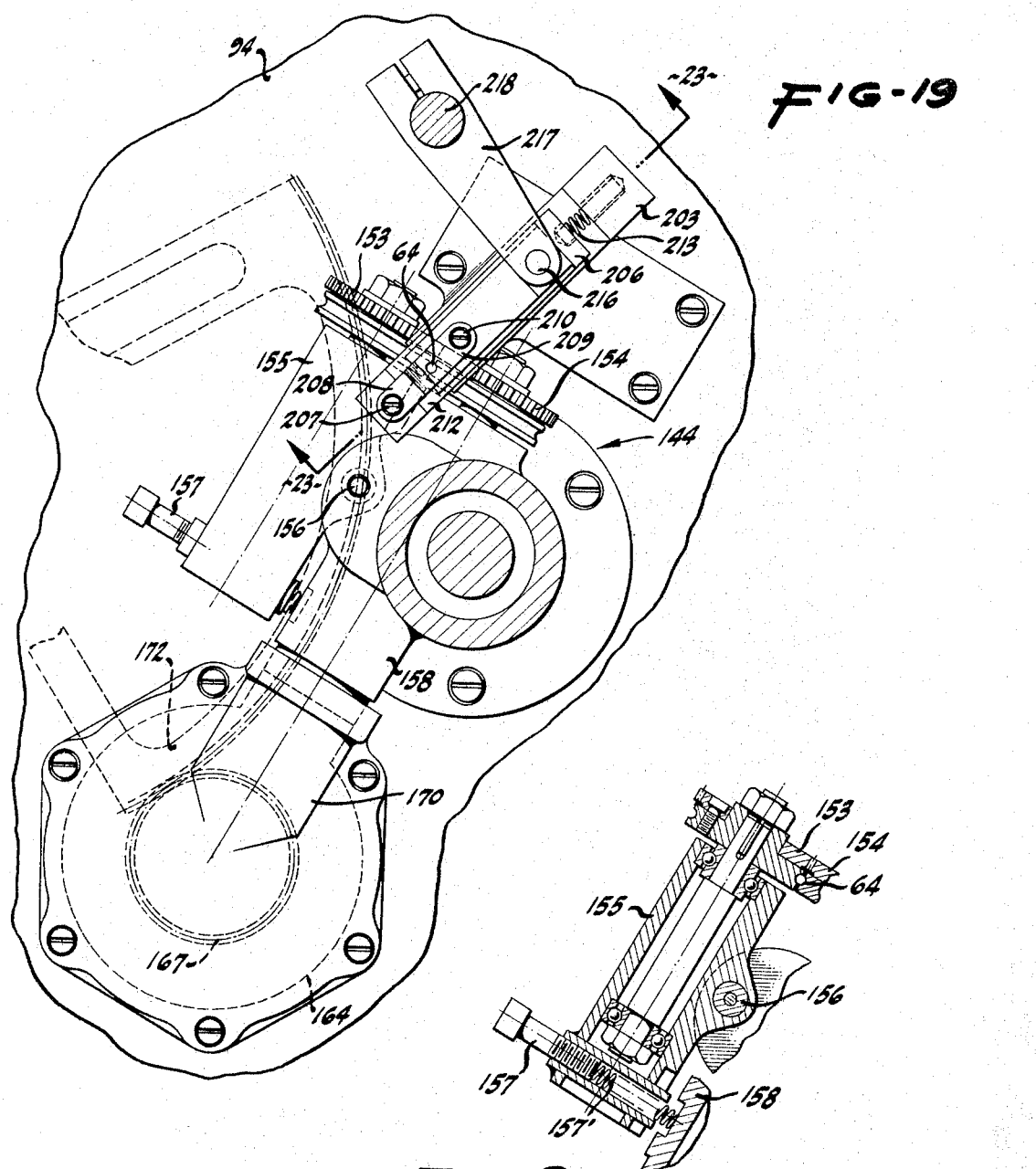

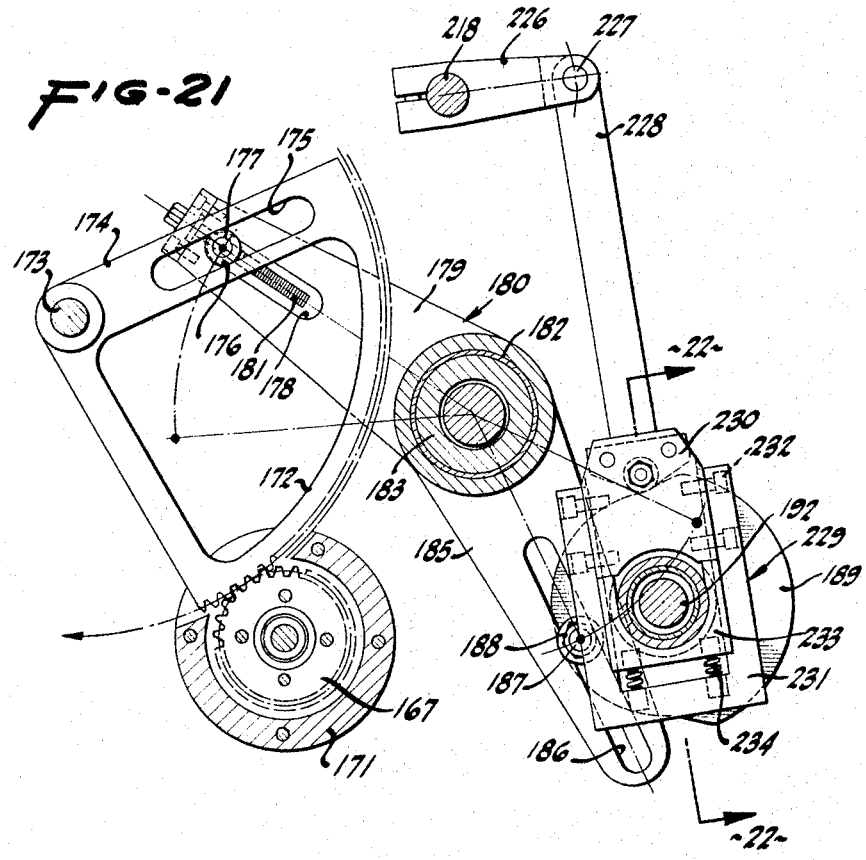
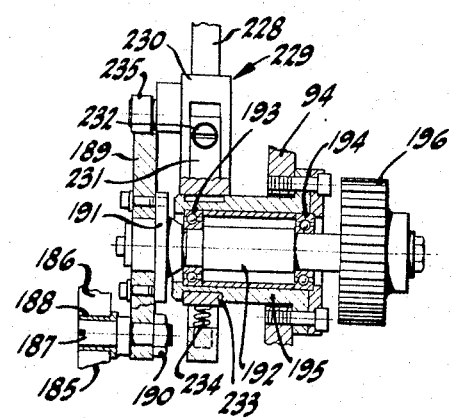

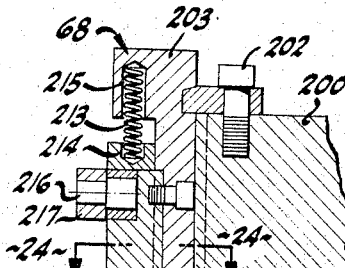
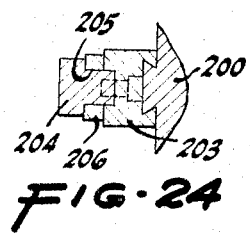
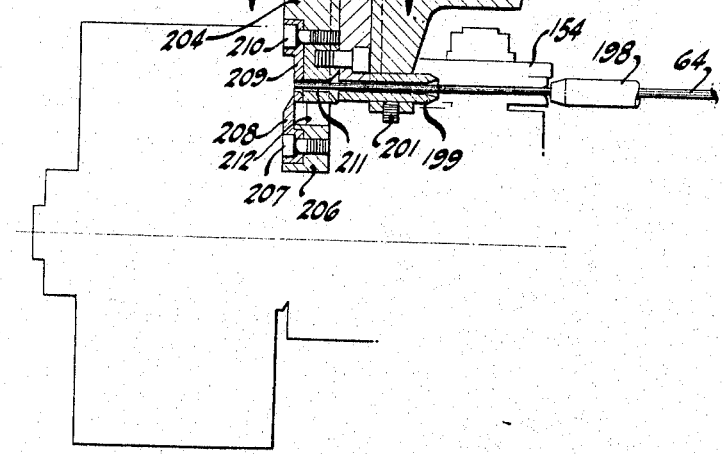
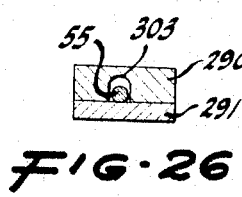
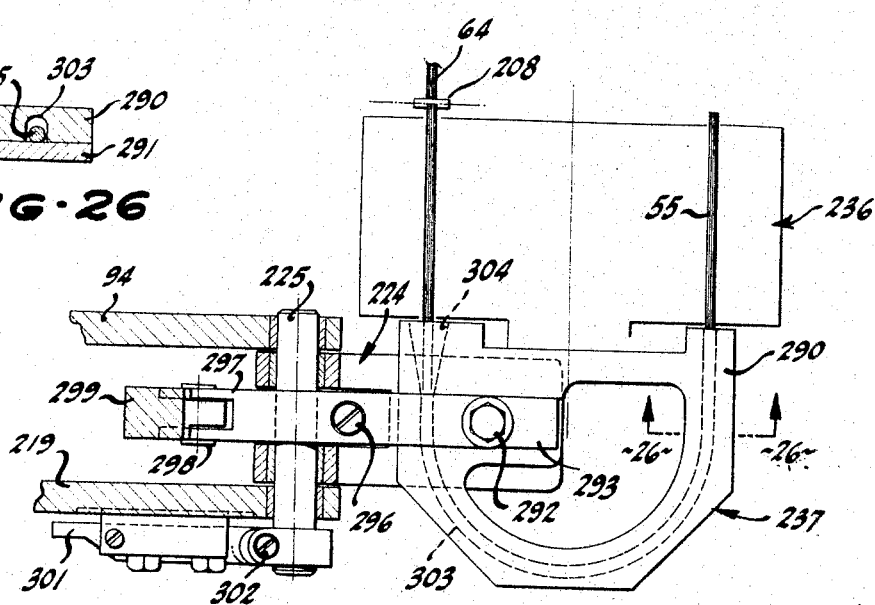
INVENTOR.
CHARLES L. CRAIG United States Patent Office 3,334,550
Patented Aug. 8, 1967

3,334,550
APPARATUS FOR AND METHOD OF MAKING HANDLES AND APPLYING SAME TO A BAG
Charles L. Craig, Orinda, Calif., assignor to Crown Zellerbach Corporation, San Francisco, Calif., a corporation of California
Filed July 23, 1964, Ser. No. 384,650
54 Claims. (Cl. 93—8)

ABSTRACT OF THE DISCLOSURE

Method of and apparatus for forming handles from paper cording and for attaching such handles to the opposite sides of a preformed paper shopping bag by means of fastener strips adhesively secured thereto. In practice of the invention, handles for such shopping bags are provided by withdrawing from a supply roll of paper cording successive predetermined lengths thereof each of which is formed into a loop-shaped handle and severed from the cording supply. At the same time, paper webbing is withdrawn from a supply roll thereof, cut into predetermined lengths forming fastener strips, and adhesive is applied to one surface thereof. The end portions of each handle are then overlaid onto the adhesive-equipped surface of a fastener strip which is thereafter transferred to the bag adjacent the open end thereof to affix the handle thereto.

The apparatus includes cord feed structure for withdrawing predetermined lengths of cording from a supply roll, a handle-forming die having separable sections providing in their closed state a loop-shaped handle-forming passage, a cord-severing assembly for severing each formed handle from the cording supply, and structure for supplying adhesive-equipped fastener strips along an assembly drum equipped to receive the loop-shaped handles from the forming die via a transfer drum so as to secure such handles to the fastener strips, and which assembly drum then applies each handle-equipped fastener strip to a paper shopping bag.

This invention relates to apparatus for and a method of making handles and applying the same to a bag; and is useful, for example, in forming looped handles from cording and for applying such handles to a paper bag or sack to make a shopping bag therefrom.

Paper shopping bags are being used today in substantial quantities, and to a great extent are intended to serve as a convenience for the shopper in carrying the various articles he has purchased. Consequently, it is desirable to provide shopping bags at the lowest possible cost, and the attainment of this objective is furthered if all of the manual and semiautomatic operations customarily involved in making handle-equipped shopping bags are performed by high speed automatic equipment. Accordingly, a general object of the present invention is in the provision of improved apparatus for and a method of forming and applying looped cord handles to bags to make shopping bags therefrom.

In attaining this objective, bags or sacks which are completely formed except that they are without handles are advanced one-by-one along a predetermined path and in a generally horizontal plane with the opposite sides of the bags being disposed in contiguous relation one above the other. A pair of cord lengths are respectively withdrawn from supply rolls and are formed into looped handles which are then severed from their parent strands. Additionally, a pair of narrow webs are withdrawn from supply rolls and are respectively cut into predetermined lengths to form fastener strips. Then each such web length or fastener strip has an adhesive applied to one side thereof as it is advanced into an assembly station. At such station, the looped handles are respectively placed upon the adhesive-coated surfaces of the fastener strips, and the resultant handle-equipped strips or patches are then appropriately placed along the opposite sides of a bag so as to be adhesively secured thereto. The bags with the handles thereon are then discharged as completed shopping bags ready for assembly into bundles for storage and shipment.

Specific objects and advantages of the invention will become apparent as the specification develops.

An embodiment of the invention is illustrated in the accompanying drawings, in which:

FIGURE 1 is a diagrammatic perspective view showing the sequence of steps or operations in equipping a bag with looped handles to form a shopping bag in accordance with the invention;

FIGURE 2 is a somewhat diagrammatic view illustrating sensing and control devices associated with one of the cord feeding assemblies;

FIGURE 3 is a broken perspective view of a shopping bag equipped with looped handles in accordance with the present invention;

FIGURE 4 is an enlarged, broken perspective view somewhat diagrammatic in character and illustrating certain of the operations performed in equipping a bag with looped handles;

FIGURE 7 is a broken side view in elevation of a portion of the apparatus illustrated in FIGURE 4, showing such apparatus in a subsequent condition in the cycle of operation thereof;

Figure 5:
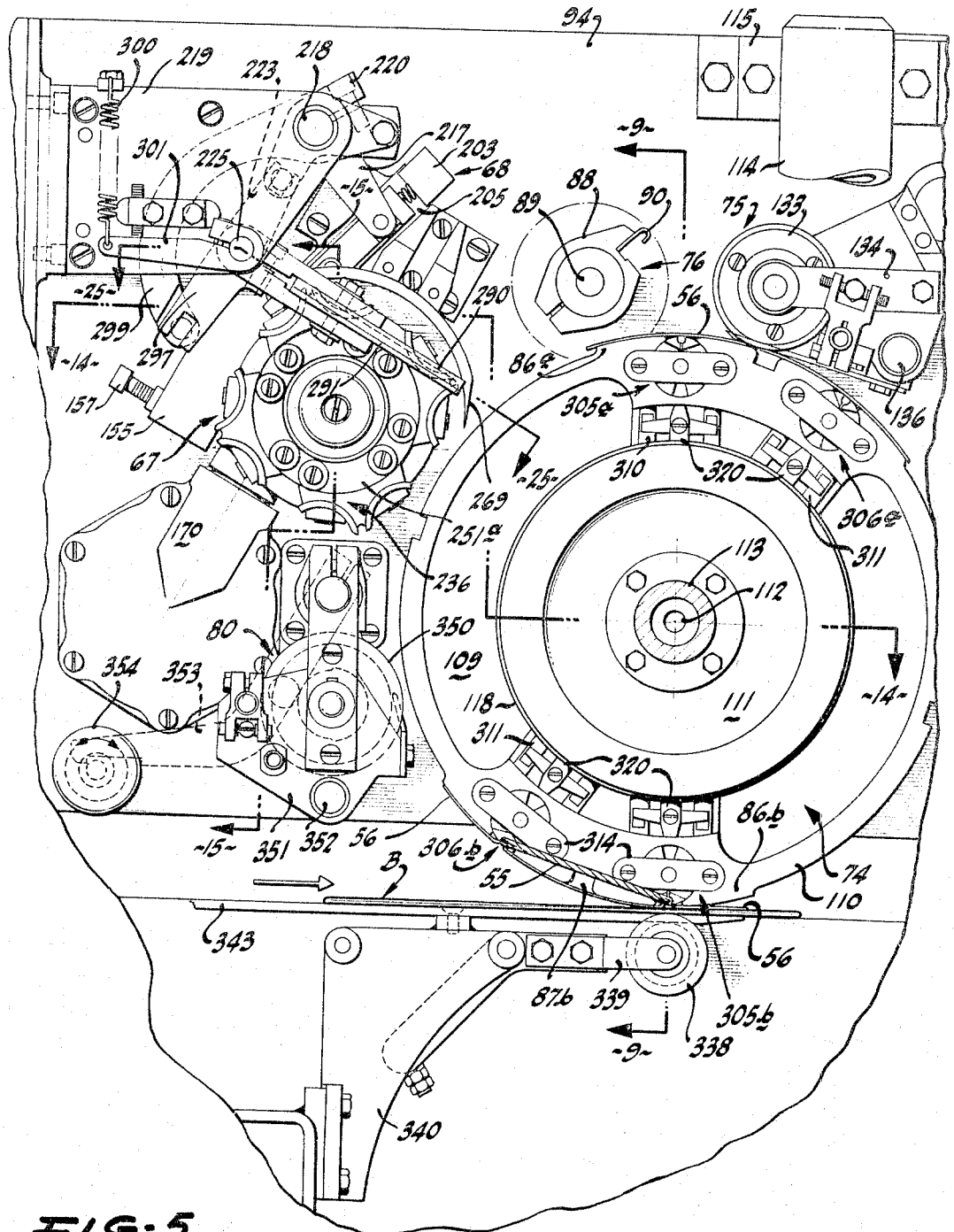
FIGURE 5 is an enlarged, broken side view in elevation of the apparatus and particularly that portion thereof shown in FIGURE 4.
Figure 6:
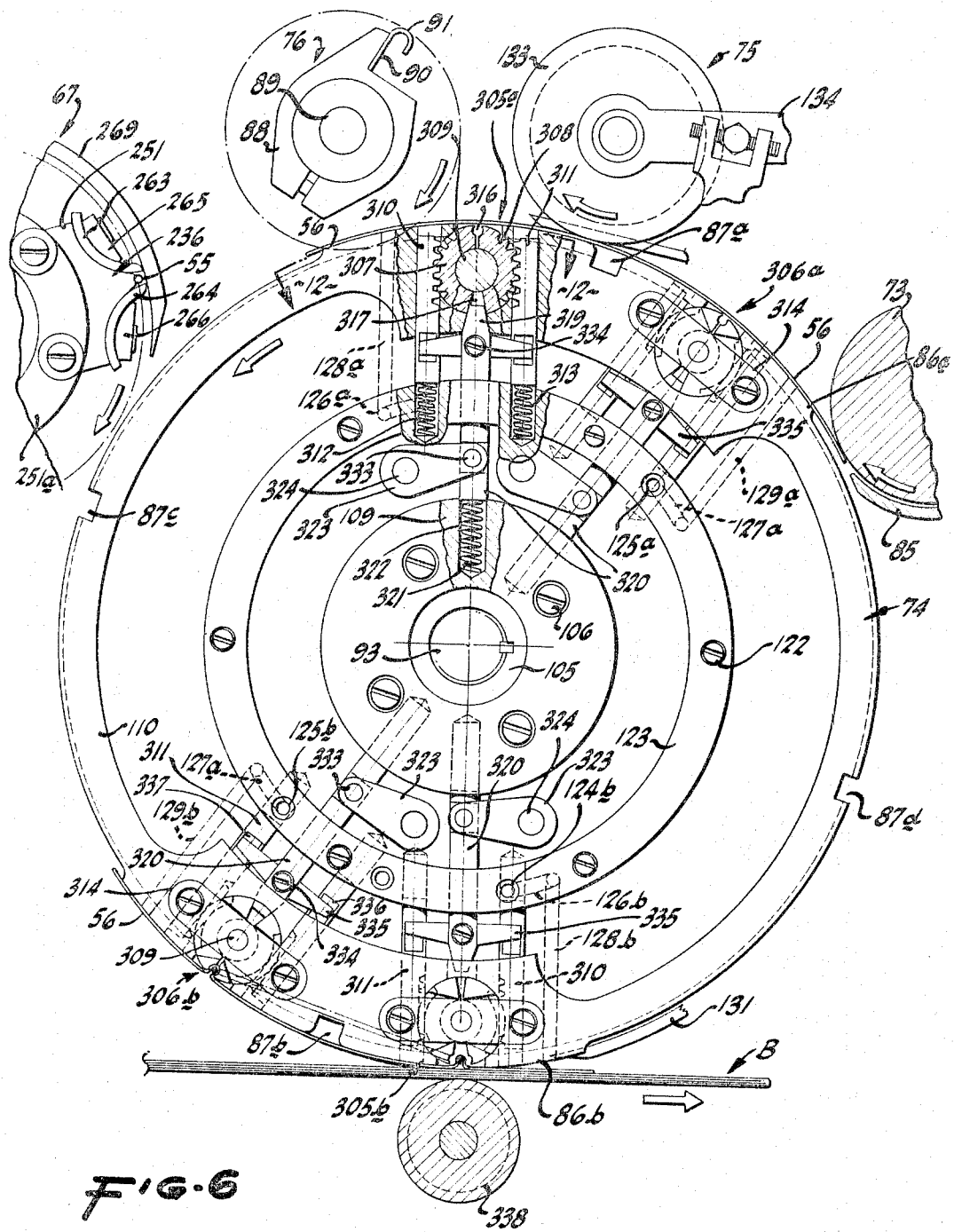
FIGURE 6 is a further enlarged vertical sectional view, with parts of the apparatus broken away and shown in section, of a portion of the mechanism illustrated in FIGURE 5, the section being taken along the line 6—6 of FIGURE 9.
Figure 13:
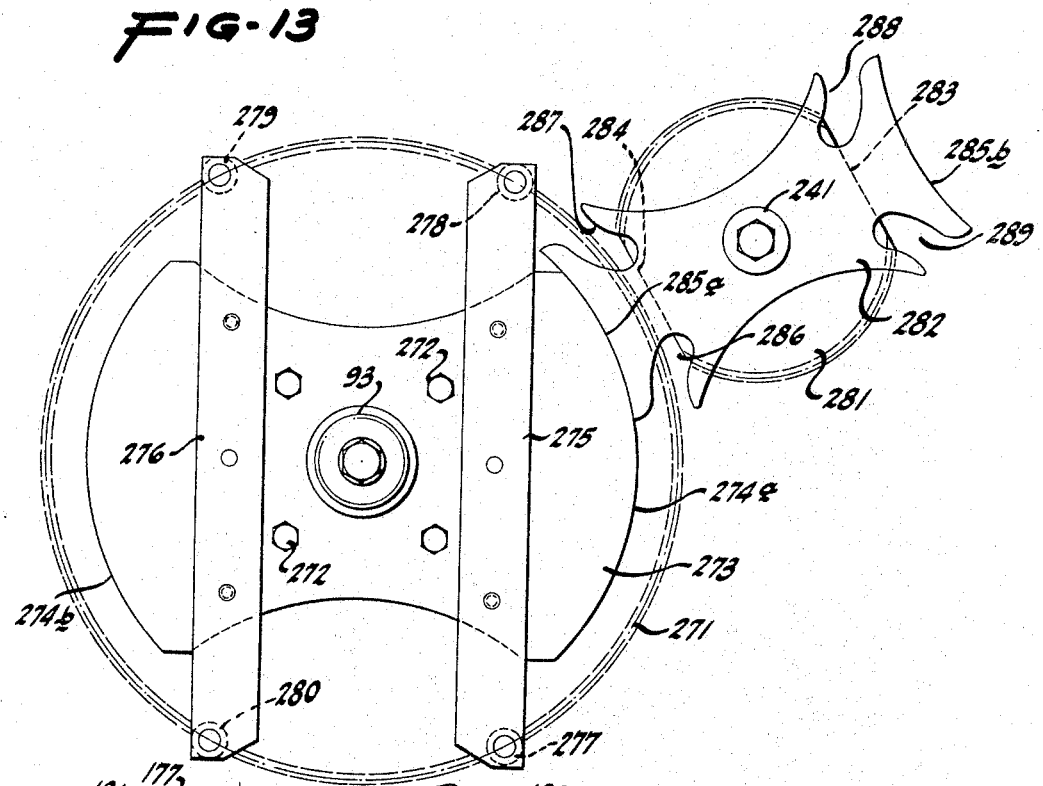
Figure 14:
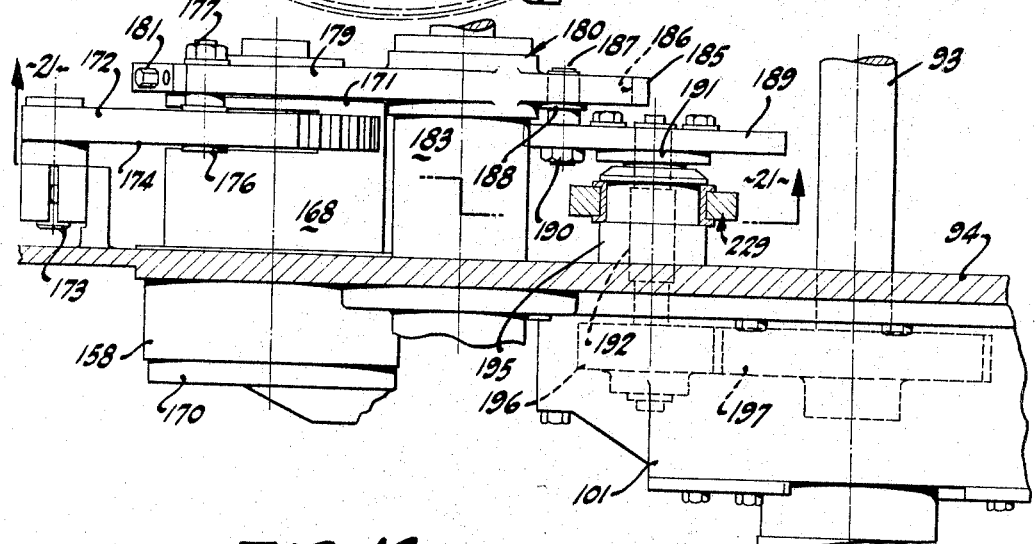

FIGRE 8 is a still further enlarged broken side view in elevation of a portion of the structure shown in FIGURE 7, but illustrating the same in a still further condition in its cycle of operation;

FIGURE 9 is a broken transverse sectional view taken along the plane 9—9 of FIGURE 5;

FIGURE 10 is a broken vertical sectional view taken along the plane 10—10 of FIGURE 9;

FIGURE 11 is a broken vertical sectional view taken along the plane 11—11 of FIGURE 9;

FIGURE 12 is a broken top plan view of the assembly cylinder or drum taken along the line 12—12 of FIGURE 6;

FIGURE 13 is a vertical sectional view taken along the plane 13—13 of FIGURE 9;

FIGURE 14 is a longitudinal sectional view taken along the line 14—14 of FIGURE 5;

FIGURE 15 is an enlarged transverse sectional view taken along the line 15—15 of FIGURE 5;

FIGURE 16 is a vertical sectional view taken along the plane 16—16 of FIGURE 15;

FIGURE 17 is a hybrid sectional view taken along the plane 17—17 of FIGURE 16;

FIGURE 18 is an enlarged broken side view in elevation generally similar to that of FIGURE 3, but showing the cord-severing knife in the upper cut-off position thereof and the loop-forming die in its open position;

FIGURE 19 is a broken vertical sectional view taken along the line 19—19 of FIGURE 15;

FIGURE 20 is a broken sectional view of the mounting assembly for the idler cord-feed roller;

FIGURE 21 is a longitudinal sectional view taken along the line 21—21 of FIGURE 14;

FIGURE 22 is a broken vertical sectional view taken along the plane 22—22 of FIGURE 21;

FIGURE 23 is a broken hybrid sectional view taken along the plane 23—23 of FIGURE 19;

FIGURE 24 is a broken horizontal sectional view taken along the plane 24—24 of FIGURE 23;

FIGURE 25 is a broken hybrid sectional view taken along the line 25—25 of FIGURE 5; and FIGURE 26 is a broken horizontal sectional view taken along the plane 26—26 of FIGURE 25.

*General explanation*

The general or overall system for forming a pair of handles and for applying the same to a bag will first be described briefly with particular reference to FIGURES 1 through 4. In the usual instance, the bags to which a pair of handles are to be applied are formed of paper, and have a closed bottom and an open top. Such bags generally have a single-wall thickness although where desired, multiple-wall bags may be used. Ordinarily, the bags are made of paper, but they could be formed of some other material. Similarly, the handles being applied to such bags are made of paper cording although they certainly could be formed of fiber rope or some other suitable material. A completed shopping bag is illustrated in FIGURE 3 and is designated generally with the letter B.

Such typical bag B is seen to have a pair of side walls 50 and 51 integrally interconnected at the opposite edges thereof by gussets 52 and 53. In the specific illustration, the bag B is a single-wall bag formed of paper and made in the usual manner on conventional bag-making machinery. The upper end of the bag is open, and respectively secured to the side walls 50 and 51 are looped handles 54 and 55. The handles are identical and each is adhesively secured to its associated side wall by a tape strip or fastener strip 56. Each strip 56 is deformed transversely at spaced apart locations therealong to provide channels 57 and 58 that respectively receive therein the opposite legs of the associated handle, which legs for identification are designated 59 and 60. The handle, or particularly the legs 59 and 60 thereof, are adhesively secured to the fastener strip 56 and also to the outer surface of the adjacent bag wall. The fastener strip 56 along its length is also adhesively secured to such bag wall.

The longitudinal axis of each fastener strip 56 is substantially normal to the longitudinal axis (i.e., top to bottom) of the bag B, and in particular to the axes of the associated side walls 50 and 51 thereof; and in that the legs 59 and 60 of the handle are transversely disposed and are generally normal to such axis of the associated fastener strip 56, the axes of such legs extend along and are generally parallel to the longitudinal axis of the bag. Therefore, the force transmitted between the handles and bag when a properly loaded bag is carried by the handles is essentially a tensile force directed along the planes of the side walls 50 and 51. The direction of such force transmission takes advantage of the relatively great strength of paper in tension and correspondingly minimizes the transmission of angularly disposed shear or tear-producing forces between the handles and bag walls.

A supply of bags or sacks before handles are affixed thereto is fed to the apparatus by hand or by automatic infeed mechanism (not shown), and such bags are successively advanced one-by-one through the apparatus. In FIGURE 1 a stack 61 of bags is shown located at the infeed or entrance of the apparatus, and the bags are advanced forwardly therefrom by a conventional conveyor equipped with spaced flights each of which engages a bag along a gusset edge thereof and advances the same through the apparatus. Such conveyor has been omitted from the illustration in FIGURE 1 for purposes of clarity of detail, but is shown in FIGURE 9 and is designated generally with the letter C. Although the conveyor may be conventional, it will be described in further detail hereinafter.

The apparatus is essentially both functionally and structurally symmetrical above and below the horizontal longitudinal center thereof because it is required to form two separate handles for each bag and then respectively apply such handles to the side walls 50 and 51 thereof which are horizontally disposed and oriented in vertical juxtaposition as the bag is advanced through the apparatus along such longitudinal center line thereof. Thus, one of the symmetrical sections of the apparatus forms the handle 54 and applies it to the side wall 50 of the bag, while the other symmetrical section forms the handle 55 and applies it to the side wall 51 of the bag. The upper section of the apparatus comprises a plurality of components including a handle-forming component generally denoted with the letter H, a component F for making each fastener strip 56 that secures the upper handle to the side wall 51 of a bag, and an assembly mechanism generally designated with the letter A for applying the upper handle 55 and tape strip 56 to a bag. As indicated, the lower section of the apparatus is essentially symmetrical relative to such upper section, and the respectively corresponding components are denoted with the letter H', F' and A'.

A pair of conveyor belts extends rearwardly from the assembly components A and A' along the longitudinal axis or horizontal center line of the apparatus, and cooperates with the aforementioned conveyor C in advancing the bags toward the discharge station of the apparatus. In particular, such belts (denoted 62 and 63 for positive identification) are used to apply a compressive force to each bag, the handles and fastener strips thereon, while the adhesive used to join such elements is afforded time to set. Thus, the adjacent stretches of the belts move in the same rearward direction in substantially contiguous relation.

In a sequence of operations, a continuous length of cording 64 is withdrawn from a parent roll 65 and is advanced through a tension- and size-sensing assembly 66 to a handle-forming station 67 at which the cording 64 is made into looped handles 55. As each such handle 55 is formed, it is severed from the continuous length of cording by a cutting or knife assembly 68 preparatory to applying the handle to a bag. In a somewhat similar manner, a continuous strip of tape 69 is withdrawn from a supply roll 70 and is advanced through a printer 71 at which, if desired, indicia such as advertising may be applied to the tape. From the printer 71, the continuous tape is advanced through a cutting station 72 at which it is cut into lengths corresponding to the fastener strips 56. Each such cut strip is then positively advanced by a transfer or guide roller 73 and onto a predetermined surface portion of a transfer and assembly drum 74. The transfer roller 73 has a peripherally interrupted surface and cyclically defines a nip with each such surface portion of the assembly drum to successively transfer each fastener strip thereto. The tape strip is held on or clamped to each such predetermined surface portion of the drum 74 at spaced apart locations therealong by vacuum suction means, as will be described hereinafter.

The drum advances each tape strip through a first adhesive-applying station 75 whereat an adhesive pattern consisting of a plurality of spaced apart adhesive stripes are applied to the tape strip along the length thereof. The drum 74 also advances each tape strip through a slack-producing station 76 (FIGURE 4) at which the strip is deformed transversely by providing a rib 77 thereacross. The material forming such rib is subsequently employed to provide the aforementioned channels 57 and 58 that respectively receive the legs 59 and 60 of the handle 55 therein. The legs 59 and 60 of the looped handle 55 are then brought into engagement with the tape strip 56; and in particular, the leg 59 is pressed against the tape strip 56 and is displaced therewith into a first clamping station 78, and subsequently the leg 60 and tape strip are displaced into a second clamping station 79. Such displacements of the tape strip 56 at the clamping stations form the channels 57 and 58 and, as stated, the material requisite for such channels is taken from and constitutes the material which comprised the rib 77.

Next, the drum 74 advances the handle-equipped tape strip 56 through a second adhesive-applying station 80 at which an additional pattern of adhesive is applied to both the tape strip and juxtaposed legs 59 and 60 of the looped handle 55. Such second adhesive pattern comprises a plurality of spaced apart stripes which are offset with respect to and therefore interposed between or interlaced with the prior deposited stripes. Thus, the handle 55 is adhesively secured to the tape strip 56 by the first glue pattern applied at the station 75, and it will also be adhesively secured to the side wall 51 of the bag B by the adhesive pattern applied at the station 80. The tape strip 56 will be adhesively secured to the bag by the entire adhesive pattern deposited at the two stations 75 and 80. As the drum 74 further advances the handle-equipped tape strip 56 past the second adhesive station 80, such tape strip is brought into engagement with the side wall 51 of a bag that is advanced beneath the drum 74 in timed relation with the rotational movement thereof. The tape strip is thereby adhesively secured to such bag, which is then advanced into the grip of the conveyor belts 62 and 63 that press the tape strip and handle against the bag while the adhesive cures.

As indicated hereinbefore, the apparatus is functionally symmetrical in the sense that a lower handle 54 must be applied to each bag B along the underlying side wall 50 thereof; and to effect this result, the apparatus includes the handle-forming mechanism H', the fastener-forming mechanism F' and the assembly mechanism A'. These mechanisms comprised in the lower section of the apparatus respectively correspond to the mechanisms H, F and A heretofore described and will not, therefore, be further elaborated. Wherever convenient in FIGURE 1 and elsewhere in the drawings, the primed form of the numerals used in connection with the description of the mechanisms H, F and A will be applied to the respectively corresponding components in the mechanisms H', F' and A'.

*The fastener-forming mechanism*

In further elaborating the fastener-forming mechanism F, and again noting that the fastener-forming mechanism F' is substantially identical thereto, reference will be made in particular to FIGURES 1, 4, 5, 6 and 7. As shown in FIGURE 1, the endless strip of webbing 69 is withdrawn from a supply roll 70 rotatably supported upon any conventional and suitable backstand (not shown). In being withdrawn from the supply roll, the continuous strip of webbing is pulled over a plurality of guide rollers, such as 81 and 82, and through the printer 71 by feed rollers 83 and 84. The aforementioned knife 72 operates in timed relation with the advancement of the webbing 69 to sever the same transversely into fastener strip lengths. Each such strip (as shown best in FIGURE 6) is directed by a stationary guide 85 and the roller 73 onto the surface of the transfer and assembly drum 74. Such drum has a pair of strip-receiving segments 86a and 86b which are diametrically oriented and have surface portions that are elevated slightly with respect to the remaining circumferential surface of the drum.

Each of the elevated segments 86a and 86b may be slightly shorter in angular length than the strips 56 laid therealong, as shown in FIGURE 6; and each such segment is provided intermediate the ends thereof with a transversely extending recess or groove 87 (the suffix *a* being used to denote each of the parts or components functionally and structurally associated with the segment 86a, and the suffix *b* being used to denote those associated with the segment 86b). It may be noted that the grooves 87a and 87b are diametrically oriented, and equally spaced therebetween are two additional grooves 87c and 87d which, although not employed directly in making fastener strips 56, accommodate structure located at the slack-producing station 76.

More particularly, each of the tape strips 56 is depressed into the underlying groove 87a or 87b (as shown in FIGURE 7) at the slack-producing station 76 by a rotatable presser member comprising a holder 88 mounted upon a shaft 89 so as to rotate therewith and being equipped with a presser finger 90 which (as shown in FIGURE 9) defines a plurality of ribs or projections 91 equally spaced from each other transversely by intervening grooves or depressions 92. The angular velocities of the drum 74 and presser member are so synchronized and related that the presser finger 90 aligns with and moves into each of the grooves 87 as the drum and presser member rotate. FIGURES 4 and 7 illustrate the drum and presser member in relative positions such that the presser finger is extended into a groove 87 aligned therewith.

Evidently, the presser finger is effective to displace a tape strip 56 downwardly and into the underlying groove 87a in one instance and into the groove 87b in the other instance, and FIGURE 7 in particular illustrates one such occurrence. The grooves 87c and 87d are provided along the drum 74 simply to accommodate the presser finger 90 which makes four complete rotations for each single rotation of the drum 74. It is apparent that the angular extent of the tape strip 56 along the circumferential surface of the drum 74 is diminished by displacement of the tape strip into the underlying groove 87, and this change in extent is seen by comparing FIGURES 6 and 7, for example.

Each of the tape strips 56 is held against the surface of the drum 74, and in particular against the underlying surface of the associated segment 86, by vacuum clamping means. In describing such vacuum clamping means, it will be advantageous to first consider to some extent the structural composition of the drum 74; and for such description, FIGURES 5, 6 and 9 are perhaps most appropriate. The drum is rotatably driven from a main drive shaft 93 journalled for rotation in the frame structure of the apparatus which includes spaced apart frame elements 94 and 95 that respectively carry bearings 96 and 97 which support such shaft for rotation. The main shaft 93 intermediate the frame elements 94 and 95 passes through a gear box 98 containing a worm and pinion drive, generally indicated as 99, by means of which the shaft is rotated. The input to the gear box constitutes a shaft 100 rotatably driven by the prime mover of the apparatus which is not shown for purposes of simplification because it is completely conventional and in the usual instance will be an electric motor.

The shaft 93 passes outwardly through the frame element 94 and through a gear housing 101 bolted or otherwise rigidly secured to the frame element and which is equipped with a bearing 102 that journals the shaft for rotation relative to the housing. Keyed to the shaft 93 exteriorly of the gear housing 101 is a hub 103, which therefore rotates with the shaft. The hub 103 has a flange 104 extending radially outwardly intermediate the ends thereof, and abutting the outer surface of such flange in circumjacent relation with that portion of the hub 103 disposed outwardly of the flange is a collar 105 comprised by the drum 74. The collar 105 is fixedly clamped to the flange 104 by a plurality of bolts 106 that extend axially through the collar and flange and are threadedly received in tapped openings provided therefor in a clamping ring 107 which abuts the flange 104 on the inner side thereof. As shown in FIGURE 10, the openings 108 provided in the flange 104 and through which the bolts 106 extend are angularly elongated so as to permit slight angular adjustments of the drum 74 relative to the drive shaft 93 for timing and alignment purposes.

Formed integrally with the collar 105 and extending radially outwardly therefrom intermediate the ends thereof is a web 109 that terminates at its outer extremity in a flange or rim generally indicated as 110; and, as shown best in FIGURES 5 and 6, the flange 110 is radially enlarged to form the aforementioned strip-receiving segments 86a and 86b. Disposed along the outer side of the web 109 is a stationary vacuum manifold 111 having an inlet 112 adapted to communicate with a vacuum source or a source of reduced pressure (not shown) through a coupling 113 secured to the manifold 111 and a conduit 114 (FIGURE 5) connected with the coupling 113 and clamped by bracket structure 115 to the frame element 94. The inlet 112 is in open communication with a radially extending flow passage 116 provided in the manifold 111, and the passage 116 at its outer end opens into an enlarged port 117 provided by a stationary ring 118 mounted upon the manifold 111 in circumjacent relation with an inner end portion thereof. The precise angular orientation of the ring 118 and manifold 111 is determined by a key 119 so that in assembling the apparatus, communication between the passage 116 and port 117 will be assured and thereafter relative rotation therebetween prevented.

The ring 118 has a relatively short axially extending flow passage 120 therein that communicates at its outer end with the enlarged port 117 and at its inner end in an angularly elongated channel or chamber 121 which, as shown best in FIGURE 11, has a length somewhat in excess of 180°. Fixedly secured to the web 109 of the drum 74 by a plurality of cap screws 122 (as shown in FIGURE 6) is an annular wear ring 123 having an outer face that slidably engages the inner contiguous face of the stationary ring 118. The wear ring 123, which is rotatable relative to the stationary ring 118, has two angularly spaced pairs of flow ports opening through such outer face. As shown best in FIGURE 6, such pairs of ports are respectively associated with the segments 86a and 86b and are respectively denoted with the numerals 124a–125a and 124b–125b. Such paired flow ports are also indicated diagrammatically in FIGURE 11 in relation to the stationary ring 118 although the wear ring is actually concealed in FIGURE 11.

The wear ring 123 is also provided with a plurality of relatively short and angularly extending flow passages respectively communicating with the associated ports 124 and 125. Accordingly, a passage 126a communicates with the port 124a, and a passage 127a communicates with the port 125a; and similarly, passages 126b and 127b respectively communicate with the ports 124b and 125b. Each of the passages 126 and 127 has an outwardly turned end portion that communicates with an associated flow passage provided through the drum 74 and, in particular, through the web 109 and flange 110 thereof. In specific terms, such passages are denoted with the numerals 128a, 129a, 128b and 129b, and they respectively communicate with the passages 126a, 127a, 126b and 127b. In FIGURE 11, such flow passages 128 are illustrated diagrammatically in order to orient the same with respect to the diagrammatically illustrated wear ring 123 and web 109 and flange 110 of the drum 74.

As shown most clearly in FIGURES 12 and 9, each of the passages 128 opens outwardly along the circumferential surface of the drum; and in particular in each of these figures, the passage 128a is thusly illustrated. In terms of precise structure, the outer circumferential surface of the drum 74 or flange 110 thereof has a channel network— one of which is shown in FIGURE 12 and denoted with the numeral 130a. The function of the network 130a is to provide reduced pressure across a significant portion of the drum surface, and this is accomplished by having the passage 128a communicate with the network 130a. Evidently, each of the passages 128 and 129 will open into such a channel network.

From the foregoing description, it will be evident that as the main shaft 93 is continuously rotated, the drum 74 will be continuously rotated since it is fixedly related thereto through the collar 105 and hub 103. When the conduit 114 is connected to a vacuum source, reduced pressure will be present in the manifold port 112, and through the passage 116, port 117 and passage 120 in the arcuate channel 121. In that such channel 121 is stationary, and is therefore traversed by the wear ring 123 carried by the drum 74, the various flow ports 124 and 125 will be successively rotated into facing relation with (and therefore open communication with) the channel 121.

Referring to FIGURE 11, with the wear ring 123 in the instantaneous angular position shown, the flow ports 125b and 124a are both in communication with the channel 121, the flow port 125a is about to rotate into communication with the channel and the flow port 124b has just been rotated out of communication with the channel—the wear ring 123 rotating in the direction of the arrows relative to the stationary channel 121. Thus, a reduced pressure is present in the channel network 130a communicating with the port 124a through the passages 128a and 126a; and similarly, the channel network so connected with the passage 129b will be at reduced pressure. Consequently, in this angular position of the drum any fastener strip disposed along the segment 86a will have its leading edge clamped to the circumferential surface of such segment by the channel network 130a, and any tape strip extending along the segment 86b will have its trailing end portion clamped to the circumferential surface thereof.

As the drum continues to rotate in a counterclockwise direction, the tape strip 56 extending along the segment 86a will be clamped thereto at both ends at the time the drum brings the port 125 into communication with the channel 121. At about this same time, the port 125b will be rotated out of communication with the passage 121, and the tape strip 56 extending along the segment 86b will then be free to be withdrawn therefrom. Although the tape strip may fall freely from the underlying segment once the vacuum has been removed, it may be desirable to provide stationary stripper fingers 131, as indicated in FIGURE 6, to assure separation of the tape strip from the drum.

In this same respect, the stationary ring 118 (as shown in FIGURES 9 and 11) is provided with a bleed or exhaust port 132 located just beyond the terminal end of the channel 121 which has an inwardly facing inlet adapted to successively communicate with each of the ports 124 and 125 in the wear ring 123 so as to provide atmospheric pressure at each channel network 130 as such networks are successively brought into flow communication with the exhaust port—which communication is established just prior to the tape strip being removed from the underlying segment 86 at the stripping station defined by the stripper fingers 131.

The fastener strip-forming section of the apparatus also includes the aforementioned first glue-applying station 74 at which an adhesive pattern consisting of a plurality of spaced apart adhesive stripes are applied to each fastener strip 56 subsequent to its being laid onto a drum segment 86. The glue-applying station may be conventional in a structural sense and includes an adhesive-applicator cylinder or roller 133 supported for rotation in a yoke or frame 134. For purposes of the present invention, the adhesive applicator structure may be of the transfer roll type or it may be of the extrusion type as, for example, the extrusion applicator disclosed in the copending application of Rudolf Weis, Serial No. 246,518, filed December 21, 1962. In either event, the cylindrical surface 135 of the applicator roll is provided with a plurality of spaced apart ribs or ridges adapted to effectively engage the surface of a fastener strip 56 and deposit the aforementioned strips of adhesive therealong. The spaces or gaps between such adhesive stripes on the fastener strip correspond to the spaces between such ribs or ridges along the surface 135 of the applicator roll.

In the adhesive applicator structure shown in FIGURE 5, the roll 133 and yoke 134 may be pivoted in a clockwise direction about the shaft 136 to remove the roller 133 from adjacency with the drum 74 for cleaning and other maintenance purposes. Further, the applicator structure includes adjustment means for accurately positioning the cylindrical surface of the applicator roll 133 with respect to a fastener strip 56 passing there under; and in that such strip is supported along the surface of one or the other of the segments 86 (each surface of which is disposed radially outwardly of the remaining circumferential surface of the drum), the roll 133 is normally spaced from the drum surfaces intermediate the segments 86. However, the roll 133 is cyclically oscillated or lifted away from the drum 74 and then returned thereto in a time relationship such that the application of the adhesive stripes commence and terminates about ¼ inch from the respective ends of each fastener strip. This is to prevent the adhesive from overrunning the fastener strips. Such oscillatory movement of the applicator roll is conventional and is ordinarily obtained by cam structures, not shown.

As mentioned hereinbefore, the presser finger 90 at the slack-producing station 76 has a serrated surface, as shown best in FIGURE 9, comprising a plurality of spaced apart ribs 91 which are separated from each other by spaces 92. The ribs 91 and spaces therebetween are so oriented with respect to the adhesive stripes along a fastener strip 56 (and, therefore, with respect to the ribs and gaps along the cylindrical surface 135 of the applicator roll 133) that the ribs 91 align with the gaps between adhesive stripes, and the spaces or recesses 92 respectively align with the adhesive stripes. Consequently, as the presser finger 90 engages a fastener strip 56 to displace the same downwardly and into a groove 87, the adhesive stripes are not smeared by engagement of the presser finger therewith.

In an operational sequence in which a tape strip 56 is formed in preparation to having a handle 55 adhesively secured thereto, the relatively narrow webbing 69 is withdrawn from the supply roll 70 by the feed rolls 83 and 84 and, if desired, indicia of appropriate character is printed along one surface of the strip by the printer 71. The knife 72 is operated in timed relation with the advancement of such strip 69 to sever the same into fastener strip lengths. Each such length is applied to the rotating assembly drum 74 by advancing the fastener strips one-by-one through the structure including the guide 85 and roller 73; and the movements of the drum 74, roller 73 and continuous webbing 69 are such that each fastener strip 56 is laid along one or the other of the segments 86a or 86b.

Shortly after the forward end portion of a tape strip 56 is laid along the leading end portion of such segment 86, the leading vacuum port 124 of the wear ring 123 (which is affixed to and rotates with the drum 74) is advanced into alignment and flow communication with the channel 121 in the stationary ring 118 secured to the vacuum manifold 111. As a result of such flow communication, a reduced pressure is established in the channel network 130 connected with such vacuum port 124, whereupon the leading end portion of the fastener strip 56 is vacuum-clamped to the outer surface of the underlying segment 86 of the assembly drum 74.

At about this same time, and usually just following such vacuum-clamping of the leading end portion of the fastener strip to the segment 86, the leading end thereof is advanced through the adhesive applicator station 75 at which the glue stripes commence to be applied to the outwardly oriented surface of the fastener strip. As the strip continues to be advanced by the drum 74, additional lengths of the strip are laid along the segment 86, and such lengths are subsequently advanced through the adhesive-applying station. Ultimately, the midportion of the segment 86 advances into the slack-producing station 76, and the angularly advancing groove 87 and presser finger 90 come into alignment, at which time the presser finger displaces the strip 56 downwardly and into the groove 87, as shown in FIGURE 7.

At approximately the same time, and usually just following this operation, the vacuum port 125 which communicates with the trailing channel network 130 is advanced into alignment and flow communication with the channel 121 in the stationary ring 118, whereupon the reduced pressure then present in such channel network vacuum-clamps the trailing end portion of the fastener strip 56 to the surface of the segment 86. As the drum 74 further carries the tape strip in a counterclockwise direction (as viewed in FIGURE 6), the entire length of the strip passes through the adhesive-applying station 75 and, as will be described in detail hereinafter, a looped handle 55 is thereafter applied to such tape strip and it is deformed as shown at 57 and 58 (FIGURE 3) to receive the legs 59 and 60 of such handle. An additional glue pattern is then applied to the tape strip 56 at the second adhesive-applying station 80, and finally, the handle-equipped fastener strip is carried to the bottom of the drum 74 and into the position generally indicated by the segment 86b in FIGURE 6, at which time the strip is removed from the drum and is applied to an underlying bag.

As part of this last operation, the leading vacuum port 124 advances into alignment and flow communication with the bleed or exhaust port 132, whereupon the vacuum-clamp securing the leading end of the strip 56 to the segment 86 is destroyed and such leading end of the strip may be deposited onto an underlying bag. Ultimately, the trailing vacuum port 125 similarly is advanced into flow communication with the bleed port 132, whereupon the trailing end portion of the strip 56 is released from the segment 86 and can be removed from the drum. While such removal of a handle-equipped tape strip 56 is taking place, another tape strip 56 is being laid along the opposite drum segment 86, an adhesive pattern is being applied to such tape strip at the station 75, and the tape strip is being deformed into the groove 87, all as heretofore described.

*The handle-forming mechanism*

In describing the handle-forming mechanism H, reference will be made in particular to FIGURES 1, 2, 4, 5, 9 and 13 through 26. As illustrated in these figures, the cording 64 is intermittently withdrawn from the parent roll 65 at the rate at which it is required for forming handles 55; and as the cording is withdrawn from such parent roll, it passes through the aforementioned tension-and size-sensing assembly 66. As shown in FIGURE 2, the assembly 66 includes a sheave or idler roller 137 rotatably supported adjacent an end portion of a bracket or bifurcated support arm 138 pivotally carried adjacent the opposite end portion thereof by mounting structure 139. The arm 138 is resiliently biased in a clockwise direction relative to the pivotal support therefor by a helical spring 140; and, therefore, the roller 137 serves as a take-up device for the cord 64.

A second idler roller equipped with a cam 141 is intended to be rotated by the cording 64 advancing thereover, and the cam is provided therealong with a lobe that repetitively engages the movable contact 142 of a switch 143 to cyclically close the same. The switch is connected in the power circuit of the machine through time delay means so that if the switch 143 is not periodically closed at or faster than a predetermined rate (every few seconds in a typical embodiment of the apparatus), the power circuit will be interrupted and the machine de-energized. In the usual instance, such time delay means will constitute a stop motion control device as, for example, the commerically available device known as the Farmer CK Timer.

Evidently, so long as the cording 64 is being properly withdrawn from the parent roll 65, the switch 143 will be repetitively opened and closed at a cyclic frequency sufficient to satisfy the time requirements of the stop motion control device. Ordinarily, this condition will be satisfied as the cord feed assembly (indicated diagrammatically at 144 in FIGURE 2) intermittently advances successive predetermined lengths of cording. However, should the cording become depleted (i.e., no cord) or a jam develop (i.e., no advancement of the cording), the machine will be deenergized because the cam 141 will not be rotated and the switch 143 will not be cyclically opened and closed. This same type of depletion-jam detector can be used in association with the webbing or tape strip 69, but is not illustrated in the drawings for purposes of simplifying the disclosure.

The cording 64 is further advanced through a size detector 145 comprising a part of the mechanism 66. The size detector includes an arm 146 supported adjacent one end thereof for pivotal movement about a pin 147. Adjacent its opposite end, the arm 146 is equipped with a tube 148 of predetermined diameter through which the cording 64 passes. The arm is biased in a counterclockwise direction by a helical spring 149, and it is connected to the movable contact 150 of a switch 151 which has a fixed terminal 152 adapted to be engaged by the contact 150. The switch 151 is connected in the power circuit of the apparatus, and when the switch is opened it breaks such power circuit to deenergize the apparatus.

Ordinarily, the switch 151 is biased into the closed position thereof by the spring 149, and the tube 148 is sufficiently large relative to the cording 64 that the cording passes freely therethrough. However, should the diameter of the cording suddenly enlarge, as where it has a knot therealong, the cording is thereby prevented from passing through the tube 148, whereupon the tube is displaced in a clockwise direction against the biasing force of the spring 149, and the switch 151 is thereby opened. Thus, in a practical sense, the size detector 145 is a knot detector and functions to terminate operation of the apparatus whenever a knot appears along the cording which has some lateral or radial dimension in excess of the minimum accommodated by the tube 148.

The feed roll assembly 144, as shown best in FIGURE 19, comprises a pair of rotatable drive rolls 153 and 154 each of which has a circumferential groove or channel thereabout which conforms generally to the contour of the cord 64. The rolls 153 and 154 are mounted so that the channels therealong are in alignment, and they are disposed in adjacency so as to frictionally pass the cord 64 therebetween. The roller 153 is an idler and, as shown best in FIGURE 20, is mounted upon a shaft journalled for rotation in suitable bearing structures mounted in a casing 155 supported intermediate the ends thereof on a pin 156 for pivotal adjustments thereabout. Threadedly mounted within the lower end portion of the casing 155 is an adjusting screw 157 that seats against one end of a helical spring 157′ bearing at its opposite end against a housing 158 that supports the pivot pin 156. The helical spring 157′ resiliently biases the casing 155 in a clockwise direction to urge the idler feed roller 153 against the driven feed roller 154. The screw 157 is a loading device and, evidently, if the screw is rotated in one direction, the casing 155 tends to be displaced in a clockwise direction about the pin 156 which increases the nip force defined between the roller 153 and roller 154, and rotation of the screw 157 in the opposite direction decreases the magnitude of such nip.

The roller 154 is intermittently driven, and during each cycle of operation thereof it advances a length of cording 64 sufficient to form one looped handle 55. Referring to FIGURE 15 in particular, it is seen that the roller 154 is clamped by a nut 159 and bearing structure 160 to a shaft 161 journalled at one end for rotation relative to the housing 158 by the bearing structure 160, and journalled adjacent its other end in bearing structure 162. The nut 159 is received upon the threaded end of the shaft 161 and clamps the roller 154 and bearing structure 160 against a shoulder defined along the shaft.

Adjacent its lower end portion, the shaft 161 is equipped with a pinion gear 163 which is driven by a bevel gear 164 constrained upon the output shaft 164 of a one-way clutch mechanism 166 having a drive gear 167 defining the input thereto. The one-way clutch mechanism 166 is mounted within a casing 168 secured to the frame element 94, and the output shaft of the clutch mechanism extends through such frame element and is supported for rotation with respect thereto on bearing structure 169. The gears 163 and 164 are mounted within a housing 170 secured by cap screws to the frame element 94, and the housing 170 provides an extension of the housing 158, which is also fixedly secured to the frame element 94 by cap screws.

The one-way clutch assembly 166 may be completely conventional and, as is well known, rotates the output shaft 165 thereof in one predetermined direction when the input gear 167 is rotated in a predetermined direction. However, when the input gear 167 is rotated in the opposite direction, no output torque is delivered by the one-way clutch to the output shaft 165 thereof. The casing 168 for the one-way clutch assembly comprises a plurality of separable components and includes a component 171 which is open along the backside thereof, as viewed in FIGURE 15, so as to expose a portion of the input gear 167 for meshing engagement thereof with a sector gear 172, as shown most clearly in FIGURES 19 and 21.

As seen best in FIGURES 13 and 21, the sector gear 172 is mounted upon a shaft or pin 173 for pivotal reciprocations about the longitudinal axis thereof, and the pin 173 is supported by the frame element 94. The sector gear 172 has an arcuate length in the order of 90°, and along one extremity thereof is provided with a leg 174 having an elongated slot 175 therein that extends radially outwardly from the pivot shaft 173. Mounted within such slot 175 is a roller 176 supported for rotation upon a pin 177 that extends transversely through an elongated slot 178 provided in one leg 179 of a bell crank 180. A relatively long adjusting screw 181 extends longitudinally into the slot 178 and through a tapped opening provided therefor in the pin 177. Consequently, the location of the pin 177 along the slot 178 can be selectively determined by suitable adjustment of the screw 181. Such adjustment of the pin 177 determines the throw or length of the arcuate reciprocation of the sector gear 172.

The bell crank 180 is supported for angular displacements upon an annular wear bearing 182 (FIGURES 15 and 21) located circumjacent a reduced end portion of an elongated sleeve 183 that extends through the frame or other suitable means. The bell crank is confined upon element 94 and is rigidly secured thereto by cap screws the sleeve 183 and bearing 182 by an abutment element 184 which is affixed to the sleeve by cap screws. The opposite leg 185 of the bell crank is provided with an elongated slot 186 therealong extending radially outwardly from the axis of rotation of the bell crank. Mounted within the slot 186 for slidable displacements therealong and being rotatably supported upon a pin 187 is a roller 188. The pin 187 extends through and is secured to a cam 189 so as to rotate therewith by a nut 190 threadedly received on the end of the pin.

The cam 189 is fixedly secured by cap screws to the end plate 191 of a shaft 192 journalled in spaced apart bearing structures 193 and 194 for rotation relative to a collar 195 that extends through the frame element 94 and is fixedly secured thereto by cap screws. The shaft 192 extends beyond the collar 195 and frame element 94, and has affixed to the outer end thereof a pinion gear 196 which (as shown in FIGURE 14) is driven by a drive gear 197 fixedly secured to the main shaft 93. The drive gear 197 and pinion gear 196 driven thereby are both mounted within the gear housing 101, and, as shown in FIGURE 9, the gear 197 is keyed to the shaft 93 so as to rotate therewith.

In a cycle of operation of the described gear train, the main shaft 93 is continuously rotated as is the drive gear 197 secured thereto. As a consequence, the pinion gear 196 is continuously driven as is the shaft 192 on which it is mounted and the cam 189 carried by the shaft. Therefore, the roller 188 which is mounted upon the cam 189 continuously describes a circular path about the axis of rotation of the shaft 192. The roller 188 in being constrained within the elongated slot 186 of the arm 185 of the bell crank 180 causes such bell crank to reciprocate about the pivotal mounting therefor; and necessarily then, the roller 176 carried by the opposite arm 179 of the bell crank describes an arcuate path, the center of which is the pivotal axis of the bell crank.

The roller 176 is constrained within the elongated slot 175 of the gear sector 172, and thereby causes such gear sector to reciprocate about the axis defined by the pivot shaft 173 upon which it is supported. Therefore, the drive gear 176 defining the input to the one-way clutch 166 is cyclically reciprocated in opposite directions in accordance with the direction of motion of the gear sector 172. Through the mechanism of the one-way clutch, such reciprocable movements in one direction only of the input gear 167 are transmitted to the output shaft 165 and through the gears 164 and 163 and shaft 158 to the drive roller 154 of the cord feed mechanism 144. The corresponding rotational movement of the feed roller 154 causes it to advance a length of cording sufficient to form a looped handle 55. Reciprocable displacements of the input gear 167 in the opposite direction are ineffective, because of the one-way clutch mechanism, to impart rotational movement to the output shaft 165; and consequently, the drive roller 154 is not rotated during such reciprocable movements.

In being so advanced by the feed rollers 153 and 154, the cord 64 is guided through a tube 198 that passes through and is supported by the frame element 94, as shown most clearly in FIGURE 15. The discharge end of the guide tube 198 (FIGURE 23) terminates adjacent the feed rollers 153 and 154; and as the cording is discharged from between such rollers, it enters a tubular guide 199 that is fixed in position relative to a support 200 by a set screw 201. The support 200 is fixedly related to the frame element 94 (as shown in FIGURE 15), and anchored to the support by a key and cap screw 202 is the knife assembly 68.

The knife assembly includes a stationary bracket 203 fixedly secured to the support structure 200 by the combination of such key and cap screw 202 and a dove tail connection (FIGURE 24), and fastened to the bracket 203 by a plurality of cap screws is a stationary guide 204. The guide 204 passes through a longitudinally extending channel 205 provided in a knife carrier 206 mounted for reciprocable displacements relative to the bracket 203 and guide 204 and having affixed thereto adjacent its lower end by a cap screw 207 an upwardly facing cutting blade 208. The blade 208 slides against an anvil plate 209 fixed by a cap screw 210 to the guide 204. The guide 204 and anvil plate 209 together define an opening 211 therethrough which is axially aligned with the passage through the tube 199. The lower end portion of the knife carrier 206 is cut out or recessed as shown at 212 (such recess being the lower extremity of the channel 205) to enable the same to reciprocate without interference from the anvil plate 209 and adjacent portions of the guide 204. The knife carrier 206 is resiliently biased downwardly toward the lowermost position thereof (which is shown in FIGURES 23 and 19) by a helical spring 213 that seats at its lower end in a recess 214 provided in the knife holder and seats at its upper end within a recess 215 provided in the stationary support 203.

As seen best in FIGURES 18, 19 and 23, the reciprocable knife holder 206 has an outwardly extending abutment ledge at its upper end, and a wear block is located thereunder which is carried by a pivot pin 216 connected to an end portion of an arm 217 which adjacent its opposite end portion is bifurcated and fixedly secured thereat to a shaft 218 journalled for pivotal movements in spaced bearings respectively carried by the frame element 94 and by a frame bracket 219 rigidly related thereto (FIGURE 5). Freely mounted upon the shaft 218 so as to rotate relative thereto is a link 220 (FIGURE 8) having at its lower depending end a pin 221 extending laterally thereof that is pivotally engaged by a bifurcated end portion 222 of a drive arm 223 provided by a bell crank 224 mounted on a shaft 225 so as to rotate freely relative thereto. The shaft 225 is appropriately journalled for rotation in bearing structure provided by the frame element 94 and frame bracket 219 (FIGURE 25).

As shown in FIGURE 21, the shaft 218 has a drive link 226 fixedly secured thereto which is operative to effect pivotal displacements of the shaft. The drive link 226 is connected by a pin 227 to a push rod 228 extending downwardly from the drive link 226, and at its lower end the push rod is secured to a perimetric yoke 229 comprising a mounting block 230 which is directly secured to the shaft 228, and a U-shaped guide 231 fixed to the mounting block 230 by a plurality of cap screws 232. Slidably located within the generally U-shaped guide 231 is a slide block 233 mounted coaxially circumjacent the aforementioned fixed collar 195 and rotatable with respect thereto. The slide block 233 is smaller in the generally vertical direction than the space defined within the U-shaped guide frame 231, and as a result, the guide is movable in such general direction relative to the slide block. The guide 231 is resiliently biased downwardly relative to the slide block 233 by a plurality of helical springs 234 interposed therebetween which at their upper ends bear against the slide block and at their lower ends against the guide.

As seen most clearly in FIGURE 22, the yoke 229 (and in particular, the mounting block 230 thereof) is equipped with an outwardly extending cam follower 235 that rides along the peripheral cam surface of the aforementioned cam 189 which is continuously rotated by the shaft 189 drivingly connected to the continuously rotating main shaft 93 through the drive gear 197 and pinion gear 196.

In an operational cycle, the cam 189 is continuously driven from the main shaft 93, as heretofore described; and as a consequence of the cam follower 235 riding on the cam surface of the cam 189, the yoke 229 and push rod 228 are reciprocated generally along the longitudinal axis of the push rod 228. However, because the push rod at its upper end is pivotally connected to the link 226, which in turn is connected to the shaft 218 and drives the same, the push rod 228 and yoke 229 necessarily pivot slightly relative to the axis of the shaft 192 as they reciprocate. The yoke and slide block connection described permits such angular displacements of the yoke and push rod while affording reciprocable movement thereof.

Angular reciprocable displacements of the link 226 correspondingly reciprocate the shaft 218 since it is connected thereto. The arm 217 is also secured to the shaft 218 so as to rotate therewith; and, therefore, as the shaft 218 rotates, the cord-severing knife 208 is reciprocated between the lowermost open position illustrated in FIGURES 19 and 23 and the uppermost cord-severing position shown in FIGURE 18. It may be noted that the pin 216 and wear block carried thereby are loosely and freely positioned beneath the outwardly extending abutment ledge of the knife carrier 206 which enables the pin and block to described an arcuate path as the carrier 206 moves linearly.

The cam 189 is configured so that the shaft 218, and in particular the knife 208, are reciprocated in timed relation with the advancement of the cord 64 so as to sever the same into handle lengths immediately subsequent to the cord being looped into the handle form thereof. Quite evidently, this time relationship between the intermittent advancement of the cord 64 and severance thereof into handle lengths is enforced by the cam 189, which controls both the cord feed through the bell crank 180 and gear sector 172, and the cord severance through the push rod 228.

As the cording 64 is advanced by the feed rollers 153 and 154 through the cord cut-off station at which the cording is severed into handle lengths, it passes in one direction through a transfer wheel or roller 236 and into and through a forming guide or die 237, and thence back through the transfer roller 236 in the opposite direction (see FIGURE 23 in particular). As illustrated in greatest detail in FIGURES 15 and 16, the transfer roller 236 comprises a central hub or collar 238 having a central opening therethrough receiving a tubular sleeve 239 therein. Passing through the sleeve 239 is the outer end portion 240 of a drive shaft 241 which is provided adjacent the inner extremity of such end portion 240 with a laterally extending stop collar 242.

A pair of cone-shaped seats 243 and 244 are located coaxially circumjacent the shaft end portion 240 on opposite sides of the sleeve 239, and respectively positioned upon such seats are clamping and centering rings 245 and 246. The ring 246 bears against the stop collar 242, and a clamping flange 247 seats against the ring 245 and is drawn tightly thereagainst by a bolt 248 which is threadedly received within a tapped opening provided therefor through the outer surface of the shaft end portion 240. Thus, the transfer roller 236 is constrained upon the shaft 241 so as to rotate therewith.

The hub 238 has a laterally extending flange 249 formed integrally therewith adjacent the inner end thereof, and such flange has an annular groove or channel 250 defined along the outer surface thereof. Oriented in facing relation with the flange 249 are a plurality of support blocks or constraining flange 249 are a plurality of support blocks or constraining flange structures 251 each of which is provided with an arcuate groove or channel 252 along the inner surface thereof in substantially facing alignment with the channel 250. As shown best in FIGURE 16, the specific structure under consideration has four such support blocks or constraining flanges 251 symmetrically oriented in angularly spaced relation about the longitudinal axis of the shaft 241; and such constraining flanges are removably secured to the flange 249 by a plurality of cap screws 253 and an annular clamping ring 251a.

Each of the constraining flanges along the outer side thereof (i.e., adjacent the peripheral surface of the transfer roller 236) curves outwardly toward a radially extended central portion 254 that is somewhat triangular in cross section (as seen in FIGURES 8 and 16), but has a gentle curvature along each of the edges 255 and 256 thereof. Centrally each of the constraining flanges 251 is provided with a cordially oriented bore or passage 257 extending through such outwardly projecting central portion 254. Mounted within each bore or passage 257 is a helical spring 258 equipped at opposite ends thereof with hooks 259 and 260 which respectively engage the inner lateral extremities 261 and 262 of a pair of transfer holders 263 and 264. The transfer holders are each arcuate and have essentially the same arc of curvature as the respectively associated outer surfaces 255 and 256 of the constraining flange 251 so as to permit relatively free sliding movements therealong.

Each of the springs 258 is a tension spring and, consequently, urges the remote end portions 261 and 262 of the transfer holders toward each other (as viewed in FIGURES 8 and 16), with the result that the inner end portions thereof tend to be projected radially outwardly beyond the outer extremity of the central portion 254 of the associated constraining flange 251. To confine the transfer holders 263 and 264 along the respective surfaces 255 and 256 of the associated constraining flange 251 for slidable displacements therealong, a pair of mounting blocks 265 and 266 are employed which respectively overlie portions of the transfer holders without preventing movement thereof and are secured to the constraining flange by a plurality of cap screws 267 and 268.

As shown most clearly in FIGURES 15 and 17, the outer extremities of the transfer holders 263 and 264 are notched, and such end portions are biased by the associated spring 258 into sufficiently close proximity so as to tightly grip a length of cording 64 disposed therebetween whenever such end portions are remote from and thereby out of contact with a plurality of cam guides 269 and 270 (FIGURES 15 and 16), as is the case of the lower two transfer units shown in FIGURE 16. However, when a transfer unit is brought into engagement with the cam guides 269 and 270, the transfer holders 263 and 264 are cammed downwardly thereby against the biasing force of the spring 258, whereupon the spacing between the adjacent outer ends of the transfer holders becomes sufficiently large to freely accommodate a length of cording 64.

The transfer wheel or roller 236 is intermittently rotated in a cyclic sequence such that it is both stationary as the feed rollers 153 and 154 advance a length of cording and oriented with one pair of transfer holders in alignment with the tube 198, guide 199 and opening 211 (FIGURE 23) so that such length of cording may pass freely between the aligned transfer holders, then through the forming die 237, and finally returned through another pair of transfer holders. After the thusly formed looped handle is severed from the continuous length of cording, the transfer roller 236 is rotated so as to deposit or transfer such handle upon a tape strip being advanced by the assembly drum 74. Intermittent rotational movement is imparted to the transfer roller 236 by the shaft 241, which in turn is rotated intermittently by the star wheel drive assembly (sometimes referred to hereinafter generally as a Geneva drive) illustrated best in FIGURES 9 and 13).

Referring to such figures, it is seen that a drive gear 271 is pinned or otherwise mounted upon the main drive shaft 93 so as to rotate therewith. Affixed to the drive gear by cap screws 272 is a locking plate 273 which therefore necessarily rotates with the drive gear. The locking plate 273 is seen to have a pair of circular segments 274a and 274b which are diametrically oriented, are coaxial with respect to the main shaft 93, and have arcuate lengths in the approximate order of 90°.

Fixedly secured to the locking plate 273 are a pair of spaced apart supports 275 and 276 oriented in symmetrical parallelism about the shaft 93 in a plane normal thereto. These supports 275 and 276 are respectively equipped adjacent the outer ends thereof with drive rollers 277–278 and 279–280. As shown in FIGURE 13, all of such rollers lie along a circle, the center of curvature of which is essentially coincident with the longitudinal axis of the main shaft 93. Such rollers and the supports 275 and 276 which carry the same, together with the locking plate 273 and drive gear 271, are all constrained with respect to each other and with respect to the main shaft 93 so as to rotate therewith. Such assemblage of parts comprises the drive component of the Geneva gearing.

The driven component thereof includes a gear 281 and plate 282 which are both constrained upon the shaft 241 (FIGURE 15) so that relative rotation therebetween is prevented. The gear 281 has a cylindrical tooth-equipped surface except for two cut-out sections 283 and 284 which are diametrically oriented and have an arcuate length in the order of 60°. The plate 282 is a locking plate cooperative with the aforementioned locking plate 273, and it is provided with a pair of diametrically oriented locking surfaces 285a and 285b, each of which has a curvature coincident with and matingly related to the curvature of the locking surfaces 274a and 274b so as to permit cooperative engagement therewith, as shown in FIGURE 13.

The plate 282 is provided with a plurality of drive slots 286, 287, 288, and 289 that are dimensioned and configurated so as to respectively receive therein and permit one or the other of the drive rollers 277–280 to move therethrough. The slots are oriented in pairs respectively disposed adjacent the locking surfaces 285a and 285b with the entrances to the slots being actually positioned adjacent the ends of such locking surfaces. Thus, the slots 286 and 287 define one pair thereof located adjacent the locking surface 285a, and the slots 288 and 289 define another pair thereof located adjacent the locking surface 285b.

Adjacent the transfer drum 236 exteriorly thereof is the aforementioned loop-forming die 237, as shown best in FIGURE 25. Referring thereto and also to FIGURES 18 and 5 in particular, it is seen that the forming die comprises a pair of separable sections 290 and 291 hingedly related for pivotal movements about the longitudinal axis of the shaft 225 between an open position illustrated in FIGURE 18 and a closed position shown in FIGURE 5. To effect such pivotal movements, the section 290 is secured by a cap screw 292 to a hinge element 293 supported for movement about the axis of the shaft 225; and the section 291 is secured by a cap screw 294 to a hinge element 295 that is also supported for pivotal movement about the axis of such shaft.

In a specific sense, the upper hinge element 293 at its inner end is split so as to pass the shaft 225 therethrough, and after being properly located along the shaft, the hinge element is tightly secured thereto by a screw 296. The underlying portion of the hinge element 293 is provided with a depending link 297 which is bifurcated at its lowermost end and receives therein the flattened end portions of a pin 298 that extends through and is pivotally carried by the lower end portion of an arcuate crank arm 299. At its upper end, the arm 299 is affixed to the aforementioned shaft 218 so as to rotate therewith. Consequently, rotational displacements of the shaft 218 in a clockwise direction (as viewed in FIGURE 18) cause the crank arm 299 to be swung toward the left, whereupon the link 297 and upper die element 290 are displaced in a clockwise direction relative to the axis of the shaft 225 and into the closed position shown in FIGURE 5.

The shaft 225 is resiliently biased in a clockwise direction, as viewed in FIGURE 18, by a helical spring 300 anchored at its upper end to the frame bracket 219 and at its lower end to a link or arm 301 clamped to the shaft exteriorly of the frame bracket by a set screw 302. As a consequence of the biasing force imparted to the shaft 225 by the spring 300, the upper die section 290 is biased toward its closed position; and the lower die section 291 is also biased toward closed position by the spring 300 through the linkage composition comprising the link 297, crank arm 299, link 220 which is clamped to the crank arm and is rotatable relative to the shaft 218, pin 221, and the drive arm 223 of the bell crank 224 which comprises as the other arm thereof the hinge element 295 carrying the lower die section.

The loop-forming die 237 has an arcuate or loop-shaped passage 303 extending therethrough, as is most evident in FIGURES 25. In cross section (as shown in FIGURE 26), the passage 303 has an inverted U-shaped configuration and is defined in its entirety by the upper die section 290—the lower die section 291 being substantially planar and simply forming a lower closure for the passage or channel when the die is in its closed position, as shown in FIGURES 26 and 5. The passage 303 has entrance and exit ends, and the entrance end thereof has a tapered or enlarged mouth 304 (as shown in FIGURE 25) to facilitate insertion of the handle-forming cord thereinto.

In operation of the handle-forming mechanism H (and H′), the main shaft 93 is continuously driven from an appropriate power source as heretofore explained. As a consequence, the gear 197 is continuously rotated since it is locked upon the shaft (FIGURE 9), and it in turn drives the gear 196 (FIGURE 14) which rotates the shaft 192 that is equipped with and continuously rotates the cam 189 (also FIGURE 22). Such rotational movement of the cam 189 drives the bell crank 180 because of its connection with the cam through the drive pin 187. The bell crank is also connected to the sector gear through the drive pin 177 (FIGURE 21), and the continuous rotational movement of the cam 189 is thereby converted into angular reciprocatory movement of the sector gear 172. The sector gear 172 is in meshing engagement with the input gear 167 of the one-way clutch 166 (FIGURE 15), and thereby imparts angular reciprocatory motion to such input gear.

The one-way clutch converts such angular reciprocatory motion into intermittent unidirectional angular motion at the output gear 164 thereof; and since such output gear is connected through the gear 163 and shaft 161 with the driven feed roller 154, such feed roller has intermittent uni-directional angular motion imparted thereto. As explained heretofore, the driven feed roller 154 cooperates with the idler feed roller 153 to advance a length of cording from which a handle 55 is formed; and referring to FIGURE 25, the length of cording advanced during each operating cycle of the driven feed roller 154 is essentially equal to the cord length extending from the cord cutting knife 208, through the transfer drum 236, completely through the passage 303 in the forming die 237, and then back through the transfer drum. Thus, the angular input to the one-way clutch 166 must be sufficient in duration or extent to provide such a length of cording, and the input to the clutch is essentially determined by the throw or movement of the sector gear 172 which can be adjusted by means of the screw 181, as described hereinbefore.

Quite evidently, the transfer drum 236 must be stationary when the length of cording is advanced therethrough to form a handle 55, and at the same time the handle-forming die 237 must be closed. The transfer drum is stationary whenever the drive therefor is in the position shown in FIGURE 13 or in a position equivalent thereto. More particularly, the drive mechanism shown in FIGURE 13 is a geneva gear assembly in which the drive gear 281 thereof is fixedly secured to the main shaft 93 so as to be continuously driven thereby. Necessarily then, the plate 273 is continuously rotated since it is fixedly secured to the drive gear 281, and the supports 275 and 276 are also continuously rotated in that they are fixedly related to the plate 273. The transfer drum 236, however, is secured to the shaft 241 (FIGURE 15) and is thereby rotated only when the shaft is rotated. As shown in FIGURE 13, the shaft 241 is connected to the driven element of the geneva drive, which driven element includes the gear 281 and plate 282 each of which is affixed to the shaft 241 so that relative rotation therebetween is prevented.

In the relative positions of the drive and driven elements of the geneva gear assembly, as illustrated in FIGURE 13, the drive element including the gear 271 is being continuously rotated in a clockwise direction. The driven element comprising the gear 281 is constrained in a stationary condition because of the engagement of the locking surfaces 274a and 285a of the respective drive and driven elements. More especially, the driven element cannot be rotated relative to the longitudinal axis of the shaft 241 because rotation in either direction threabout is rigidly constrained by abutment of the arcuate surface 285a with the mating arcuate surface 274a. As the drive element continues to rotate in the clockwise direction, the locking surface 274a will slide along the mating surface 285a until such surfaces are just about to be separated, at which time the drive roller 278 is entering the drive slot 287 and is moving toward the inner terminal or closed end thereof. Driving abutment of the roller 278 with the edges of the slot 287 is effected as or just subsequently to the locking surfaces 274a and 285a becoming separated, whereupon the continued motion of the drive element in a clockwise direction causes the driven element to rotate in a counterclockwise direction about the axis of the shaft 241.

As soon as the drive roller 278 has advanced the driven element about 15°, at which time the roller is passing beyond an imaginary line extending between the centers of the main shaft 93 and shaft 241 and is then begining to withdraw from the slot 287, the flattened portion of the driven gear 281 has been advanced out of facing engagement with the drive gear 271, and the teeth of the driven gear come into meshing engagement with the teeth of the drive gear. Thereafter, the driven gear 281 is positively advanced by the drive gear 271 by such meshing engagement for an additional arcuate distance of about 150° (the length of the tooth-equipped section—approximately 115°—plus the further distance corresponding to the length of that portion of the gear 271 periphery underlying the plate 282 in the position thereof shown in FIGURE 13). At this time the opposite flattened section of the gear 281 adjacent the drive slots 288 and 289 is advancing toward facing relation with the drive gear 271 whereupon disengagement of the gears is brought about.

At the time disengagement of the teeth of the gears 271 and 281 is effected, the leading end portion of the arcuate locking surface 285b is in the approximate position occupied by the trailing end portion of the arcuate locking surface 285a as such locking surface 285a is shown in FIGURE 13 (the driven component including the gear 281 and plate 282 being rotated in a counterclockwise direction, as viewed in such figure). At this instant, the surface 275b of the driving component (rotating in a clockwise direction, as viewed in FIGURE 13, and including the gear 271 and plate 273) has advanced approximately 147° and, therefore, the leading end of the surface 274b is intermediate the ends of the surface 274a in the position thereof shown in FIGURE 13.

Consequently, at the instant that the teeth of the drive gear 271 and driven gear 281 disengage, the locking surface 285b of the plate 282 is engaged by the surface 274b of the drive plate 273 and thereby continues to drive the plate 282 and gear 281 into the locked position shown in FIGURE 13, except that the driven component has been advanced 180°. In that the circles then defined by the circular segments 274b and 285b are precisely coincident, sliding engagement of such surfaces constrains or locks the driven component against rotation and the transfer drum 236 is thereby held in a stationary position while a cord loop 55 is passed therethrough. As the locking surface 274b is advanced to a position whereat it is about to disengage from the mating surface 285b, the drive roller 280 is entering the slot 289 and the described cycle of operation is repeated.

Quite clearly then, the shaft 241 is intermittently advanced in a clockwise direction (as viewed in FIGURE 13), and the transfer drum is therefore correspondingly advanced intermittently in a clockwise direction (as viewed in FIGURES 1 and 4 through 8, inclusive). In terms of the advancement of a length of cording to form a handle 55, the transfer drum is stationary whenever the driven feed roller 154 is energized to advance a length of cording, and is thereafter actuated to transfer the formed handle to the assembly drum 74, as will be described hereinafter.

The loop-forming die 237 is also closed during each period that a length of cording is being formed into a handle 55 because such length of cording must be advanced through the passage 303 of the die in order to be formed into a loop shape. Thus, the die 237 is stationary for a period that is substantially coextensive with the period that the transfer drum 236 is stationary, although the die 237 must be opened before the formed handle can be advanced by the transfer drum 236 into appropriate relation with the assembly drum 74. Also, before the transfer drum 236 is energized, the cord-severing knife 208 must be displaced upwardly to sever the looped handle from the continuous length of cording previously advanced by the feed rollers 153 and 154 through the transfer drum and forming die.

The cord-severing knife 208 and the forming die 237 are energized from the same source namely, the push rod 228 (FIGURE 21) which is cyclically reciprocated by the continuously rotating cam 189 because of its connection thereto through the mounting block 230 of the yoke 229 and cam follower 235 which is carried by the mounting block and rides along the cam-configurated perimetric surface of the cam 189, as shown in FIGURE 22. The cam 189 is continuously rotated in the manner heretofore described because of its connection with the continuously rotating main shaft 93 through the gears 197 and 196, and shaft 192.

The push rod 228 is connected through the link 226 with the shaft 218 which, whenever it is rotated into the counterclockwise position thereof illustrated in FIGURE 18 against the biasing force of the spring 300 as supplemented by the biasing force of the spring 213 in the knife assembly, displaces the cord-severing knife 208 from its lowermost open position (illustrated in FIGURE 23) into its uppermost cut-off position shown in FIGURE 18. Such counterclockwise rotation of the shaft 218 also displaces the lower die section 291 downwardly into its open position because of the drive established through the link 220, which is rotated in a counterclockwise direction relative to the longitudinal axis of the shaft 218, and arm 223 which is pivotally connected to the link 220 through the pin 221 and clevis 222 and is thereby rotated in a clockwise direction relative to the longitudinal axis of the shaft 225.

In that the arm 223 comprises a component of the bell crank 224, which includes as the other arm thereof the hinge element 295 which carries the lower die section 291, such die section is necessarily rotated in a clockwise direction relative to the axis of the shaft 225 and into its open position. Such counterclockwise rotation of the shaft 218 also rotates the crank arm 299 in a counter-clockwise direction, which in turn displaces the link 297 in a counterclockwise direction relative to the axis of the shaft 295 and, therefore, the upper die section 290 is displaced into the open position thereof shown in FIGURE 18 because of its connection to the link 297 through the hinge element 293.

Thus, the movements of the cord-severing knife 208 and the loop-forming die 237 are coordinated and occur in a predetermined timed relation because the knife and die are both tied directly to the cam 189 and are controlled thereby through the pushrod 228. Energization of the cord-feeding rollers 153 and 154 is also directly tied to the cam 189, and therefore occurs in timed relation with the cycle of operation of the cord-cutting knife and loop-forming mechanism, because of its connection thereto through the bell crank 180, sector gear 172, and one-way clutch 166, as heretofore described. Movement of the transfer drum 236 is also coordinated with the aforementioned cycle of operation because it is governed by the controlling motion of the main shaft 93 through the geneva drive assembly, shown best in FIGURE 13 and heretofore described.

The upper section 290 of the loop-forming die 237 must be opened to a greater extent than the lower section 291 in order to permit the looped cord 55 to pass freely therebetween. More particularly, and referring to FIGURE 18, the channel 303 through which the cord is advanced to form the same into a generally U-shaped configuration is contained entirely within the upper die section 290, and therefore such die section must move far enough to completely remove the cord therefrom. Additionally, the transfer drum 236 rotates in a clockwise direction (as viewed in FIGURE 18); and evidently, the handle 55 must be afforded sufficient space between the open die sections 290 and 291 so that it can pass freely therebetween as the transfer drum is indexed into the next position thereof. Slight movement of the lower die section 291 from contact with the handle 55 is sufficient to provide adequate clearance for handle movement since it is effectively displaced in a direction away from the lower die section upon rotation of the transfer drum.

However, that path of travel of the handle moves the same toward the upper die section 290 (especially the inner end portion of the handle); and as a consequence, it is necessary that the upper die section be opened to an extent sufficient to clear the requisite path of travel for the handle 55. This differential movement as between the upper and lower die sections 290 and 291 is attained through the differential linkage 220–223–295 for the lower die section and 299–297–293 for the upper die section—both of which are driven from the shaft 218 through such linkages.

As the cording 64 is withdrawn from the supply roll 65 by the cord feed rollers 153 and 154, the cording passes through the tension and size sensing assembly 66 which is effective to terminate operation of the mechanism if the diameter of the cording enlarges excessively, as in the case where a knot occurs therealong, and if the cording breaks. The operation of the tension and size sensing assembly 66 in accomplishing these protective results is shown clearly in FIGURE 2 and has been described heretofore.

The handle-applying assembly

The handle-applying assembly A (and A') is operative to transfer a looped handle 55 to a glue-striped fastener strip being advanced by the drum 74, and to thereafter apply the handle-equipped fastener strip (after advancement thereof through a second glue-applying station) to a bag or sack fed beneath the drum 74 from the stack 61 of such bags. In transferring a handle 55 to a fastener strip 56, means are provided for gripping the strip and juxtaposed handle; and with reference to FIGURE 3, such means cause the formation in the fastener strip of the channels 57 and 58 which snugly receive the respective handle legs 59 and 60 therein. Such gripping means are best seen in FIGURE 6, and constitute a plurality of individual gripper mechanisms comprising the aforementioned clamping stations 78 and 79 (FIGURE 4). In the specific apparatus illustrated such gripper mechanisms comprise four in number—two of which are associated with the strip-receiving segment 86a and the other two with the strip-receiving segment 86b. For purposes of specific identification, the two gripper mechanisms associated with the segment 86a are designated with the numerals 305a and 306a, and those associated with the segment 86b are denoted 305b and 306b. The construction and function of all such gripper mechanisms 305 and 306 are identical, and for this reason only the mechanism 305a will be described in detail.

Referring to FIGURES 6, 7, 8 and 10 in particular, it will be apparent that the gripper mechanism 305a comprises a pair of gear segments 307 and 308 that are somewhat less than semicylindrical in angular length, and are supported upon a bearing shaft 309 for pivotal movement with respect thereto and also with respect to each other. Concerning such movement of the gear segments, they are angularly displaceable between the closed position thereof shown in FIGURE 6 and the open position illustrated in FIGURE 8. To effect such angular movement of the gear segments, they are respectively engaged by a pair of rack gears 310 and 311 that are parallel to each other and are slidably supported by the drum 74 for reciprocable displacements along axes essentially parallel to a radial line disposed therebetween as defined by the centers of the main shaft 93 and bearing shaft 309. The rack gears are respectively biased toward the outer positions thereof in which the gear segments 307 and 308 are closed at their upper or outer ends by a pair of helical springs 312 and 313 respectively associated with the rack gears.

The bearing shaft 309 is fixedly supported with respect to the drum 74 by a pair of mounting links 314 and 315 (FIGURES 7 through 9) which are bolted or otherwise rigidly secured to the segment 86a on opposite sides thereof. The gear sections 307 and 308 are configurated so as to conjointly define a groove or channel 316 therebetween at their outer ends which are located adjacent the surface of the segment 86a. The channel 316 is dimensioned to have the fastener strip 56 and juxtaposed leg of the cord handle depressed thereinto. At their inner lower edges, the gear sections 307 and 308 define a tapered recess 317 therebetween which is adapted to slidably receive therein the wedge-shaped upper end 319 of a wedge or control pin 320. The pin 320 is biased upwardly toward the position thereof shown in FIGURE 6 by a helical spring 321 that at its outer end seats against the inner end of the pin and at its inner end seats within a recess 322 provided therefor in the drum 74. Evidently, the pin 320 is radially disposed with respect to the drum, and the corresponding radial line through the pin defines the reciprocatory axis thereof.

The control pin 320 is reciprocated downwardly against the biasing force of the spring 321 by a crank arm 323 which is fixedly secured to one end of a pivot pin 324 journalled for rotation in the flange 109 of the assembly drum 74. As shown most clearly in FIGURE 9, the flange is provided with a boss 325 through which the pin 324 extends and is firmly supported thereby. The pivot pin 324 at its opposite end has fixedly clamped thereto by a cap screw 326 (FIGURE 10), a cam follower 327 provided with a roller 328 at an end portion thereof. The roller 328 rides along the inner cam-configurated surface of a first stationary cam element 329 throughout a part of the cycle of rotational movement of the cam follower, and throughout another portion of such cycle the roller 328 is adapted to ride along the inner cam-configurated surface of a second stationary cam element 330.

The cams 329 and 330 are supported by the stationary gear housing 101, and are each secured thereto by a plurality of cap screws 331 which respectively extend through a plurality of angularly elongated slots 332 in such cams. Evidently, the precise angular disposition of each cam may be adjusted within the limits defined by the slots for purposes of timing the angular reciprocatory displacements of each cam follower 327, and of the crank arm 323 fixedly realted thereto through the pivot pin 324. The first and second cam elements 329 and 330 are approximately diametrically located and are oriented and configurated so as to cause opening of each gripper mechanism as it rotates into adjacency with the transfer roller 236 to enable a looped handle 55 and underlying fastener strip to be inserted into the opening 316 then defined between the gear segments. Subsequently, the cam element 329 permits the gripper mechanism to close and it then remains closed as the assembly drum 74 continues to advance in a counterclockwise direction, as viewed in FIGURES 6 and 10, until the gripper mechanism approaches a lowermost position adjacent the infeed conveyor C. The cam element 330 then becomes effective to open the gripper mechanism and thereby permit transfer of the handle-equipped fastener strip to the underlying bag. Thereafter, the cam element 330 permits the gripper mechanism to return to the closed position thereof.

As shown most clearly in FIGURES 6 to 8, the crank arm 323 effects such opening and closing movements of the gear sections 307 and 308 in cooperation with the cam elements, through the intermediate agency of the pin 320. More specifically, the crank arm 323 is equipped adjacent the outer free end thereof with a drive shaft 333 that extends into a notch provided for the receipt thereof in the pin 320. The pin 320 is also equipped with a drive post 334 pivotal with respect thereto and having an end portion extending outwardly therefrom and to which is secured a drive bar component 335 having end portions respectively extending into radially enlarged openings 336 and 337 respectively provided by the rack gears 310 and 311.

Quite evidently, the outer end portions of the drive bar 335 are adapted to abut the respective facing surfaces defined by the recesses or openings 336 and 337 provided by the rack gears 310 and 311 whenever the drive pin 320 is displaced radially inwardly, or downwardly as viewed in FIGURE 6. Therefore, whenever the pivot pin 324 is rotated in a clockwise direction (FIGURE 6), the arm 323 is similarly rotated in a clockwise direction whereupon the drive pin 320 is displaced downwardly against the biasing force of the spring 321 because of the interconnection betweeen the pin and arm defined by the drive shaft 333. Necessarily then, the rack gears 310 and 311 are correspondingly displaced downwardly, by such movement of the drive pin 320, against the biasing force of the springs 312 and 313.

As a result of such displacement of the rack gears, the respectively associated gear sections 307 and 308 are rotated inwardly adjacent the inner or lower ends thereof to open the channel 316, as shown in FIGURE 7, for the reciept of a cord and juxtaposed fastener strip therein. That is to say, as viewed in FIGURE 6, the gear section 307 is angularly displaced in a counterclockwise direction relative to the shaft 309, and the gear section 308 is rotated in a clockwise direction relative to such shaft; and angular movements of the two gear sections in such directions are permitted because initial downward or inward displacement of the drive pin 320 withdraws the tapered tip 319 thereof from the space 317 defined between the gear sections at their adjacent inner or lower ends.

It is evident that the recesss or openings 336 and 337 are significantly wider in radial direction than the end portions of the drive bar 335, whereupon limited radial displacements of the drive bar are permitted before it establishes a driving connection with the rack gears 310 and 311. This loose fit enables the drive pin 320 and drive bar 335 to be displaced downwardly or inwardly relative to the rack gears and their respectively associated gear sections 307 and 308 by an amount sufficient to permit the tip of the drive pin to be withdrawn from the opening 317. Further, such loose fit between the drive bar and recesses results in the gear sections 307 and 307 being resiliently urged by the springs 312 and 313 into the closed position shown in FIGURE 6. This resilient biasing force enables such gear sections to automatically tailor the width or transverse dimensions of the channel 316 to the dimensional requirements of a length of cording and fastener strip disposed therewithin.

More particularly, the gauge or thickness of paper is not controlled to close tolerances because of the nature of the product and further, the thickness of adhesive applied to a fastener strip 56 at the first adhesive station 75 might vary depending upon the viscosity of the adhesive, etc. Therefore, since the thickness of the composite article comprising a tape strip, length of cording and adhesive stripes which is inserted into the channel 316 may vary considerably, and because it is desired to have such composite article tightly gripped by the gear section defining the channel 316, the loose fit defined between the drive bar 335 and recesses 336 and 337 permits the springs 312 and 313 to resiliently urge the gear sections into gripping engagement with such composite article irrespective of anticipated variations in the thickness thereof.

Once a handle-equipped fastener strip 56 has been gripped by a pair of adjacent gripper stations, continued rotation of the assembly drum 74 in a counterclockwise direction, as viewed in FIGURE 5, ultimately advances such fastener strip and handle into the illustrated position wherein the leading gripper is disposed in vertical alignment with a pressure roller 338 which, as shown in FIGURES 5 and 9, is rotatably supported by a bifurcated arm structure 339 carried by bracket 340 secured to the frame structure of the apparatus. The roller 338 is provided along the cylindrical surface thereof with a transversely spaced channels 341 and 342 that respectively receive therein a pair of longitudinally extending rails 343 and 344 that comprise a part of the infeed conveyor C.

As shown in FIGURES 5 and 9, each bag B is advanced along the rails 343 and 344 such that the open end of the bag is located in superposed relation with such rails. The actual movement of the bags is enforced thereon by a plurality of flights 345 which are secured at opposite ends thereof to endless chains 346 which are entrained at opposite ends thereof about sprockets (not shown) at least one of which must be a drive element which is, in turn, driven in timed relation with the rotational movement of the main drive shaft 93. The flights 345 are spaced apart and are adapted to respectively engage a trailing edge of a bag B positioned forwardly thereof and push the same forwardly in sliding relation with the surface of a stationary conveyor support bed 347.

The assembly drum 74, as best shown in FIGURES 9 and 12, is provided along the cylindrical surface thereof with a pair of transversely spaced channels or grooves 348 and 349 oriented in respective alignment with the channels 341 and 342 provided by the pressure roller 338. The aforementioned stripper 131 (FIGURE 6) provides a pair of spaced apart fingers that ride within the grooves 348 and 349 and thereby function to strip from the surface of the segments 86a and 86b a tape or fastener strip 56 extending therealong should such strip tend to remain in contiguous relation with the associated segment after the vacuum clamping the strip thereto has been released.

In describing the operation of the handle-applying assembly, it will be assumed that a fastener strip 56 has been vacuum-clamped to one of the segments 86 of the drum as heretofore described, and that adhesive stripes have been laid along the outer surface of such strip at the adhesive station 75. It will also be assumed that a handle 55 has been formed by the handle-forming mechanism 67, that the forming die 237 is open (as shown in FIGURE 18), and that the transfer drum 236 is ready to be indexed forwardly in a clockwise direction, as viewed in FIGURES 1 and 5 through 8. It may be noted that the assembly drum rotates in a counterclockwise direction as viewed in these same figures.

Referring to FIGURES 6 through 8 in particular, which together illustrate an operational sequence in which a handle is transferred to a fastener strip, it is seen that the relative position of the various components prior to such transfer is shown in FIGURE 6, although in this figure the assembly drum 74 has not as yet advanced to a position such that the fastener strip 56 has been depressed into the groove 87 underlying the same. In the illustrated position, the leading gripper mechanism is in the normally closed condition thereof, and the transfer drum 236 is in a position such that the transfer holders 263 and 264 associated with a looped handle 55 are pressed radially inwardly by the cam guides 269 and 270 whereupon the cord is loosely confined between the paired transfer holders.

As the assembly drum 74 continues to rotate in the counterclockwise direction, the segment 86 is advanced into a position in which the associated recess 87 cooperates with the presser finger 90 of the holder 88 to produce slack in the fastener strip 56. At about this same time, the leading cam follower 327 (FIGURE 10) has advanced into engagement with the stationary cam 329 whereupon the roller 328 of the follower is depressed inwardly and the shaft 324 thereby rotated in a clockwise direction. As a consequence, the arm 323 is similarly rotated in a clockwise direction (as shown in FIGURE 7) to displace the drive pin 320 radially inwardly and thereby open the jaws of the leading gripper mechanism preparatory to having the fastener strip and handle cording inserted thereinto. Rotation of the transfer drum 236 is initiated at about this same time so that the assembly drum 74 and transfer drum both have approximately the same peripheral velocities when they are in the relative position illustrated in FIGURE 8, at which position the fastener strip 56 and leg of the handle 55 are transferred into the channel defined between the gear sections 307 and 308.

It will be noted that the transfer holders 263 and 264 in the illustrated position of FIGURE 8, have advanced beyond the extremities of the guide cams 269 and 270, but the transfer holders are now in engagement with the peripheral surface of the assembly drum. Such engagement of the holders and drum surface is effective to displace the transfer holders inwardly and away from the cord 55, whereup the outermost radial extremity 254 of the associated support block 251 is operative to displace the cord 55 and the tape strip 56 radially outwardly from the transfer drum 236 and therefore radially inwardly with respect to the assembly drum 74, and into the channel 316 defined between the open gear sections 307 and 308. When such gear sections subsequently close, they will close upon the fastener strip and cord and thereby grippingly hold the same.

Slight additional angular displacement of the assembly drum 74 beyond the position shown in FIGURE 8, will cause the gear sections 307 and 308 to close because the configuration of the cam 329 is such that the cam follower roller 328 in riding therealong will move radially outwardly, whereupon the shaft 324 will rotate in a counterclockwise direction, as will the arm 323, with the result that the drive pin 320 will move the rack gears 310 and 311 outwardly. It will be noted in FIGURE 8, that depression of the fastener strip 56 into the channel 316 of a gripper mechanism tends to elongate the strip with the result that the material necessary to permit such depression is taken from the slack-producing deformation of the strip in the underlying recess 87. This causes the depressed portion of the strip to move outwardly somewhat from the recess 87, whereupon the slack thereby provided in the strip is partially utilized in permitting the strip to be inserted into the leading gripper mechanism. This same sequence of steps is followed with respect to the trailing gripper mechanism so that as it approaches the transfer drum 236, the gripper jaws will open and the next successive transfer holders and associated components of the transfer drum will function to insert the fastener strip and overlying cord handle into the grip of the trailing fastener mechanism.

Subsequent to the fastener strip 56 having a handle 55 transferred into engagement therewith, whereupon the fastener strip and handle are clamped to the assembly drum by the gripper mechanisms, the handle-equipped fastener strip is advanced by the assembly drum through the second adhesive-applying station 80. The adhesive applicator 80 may be an extrusion or transfer-type applicator, as in the case of the first adhesive applicator 75, and it functions in essentially the same manner. In this respect, the applicator includes a cylinder or roller 350 adapted to rollingly engage a fastener strip 56 advanced thereunder by the assembly drum 74. The roller 350 is rotatably supported by yoke or bracket structure 351 mounted for pivotal movement relative to the axis of a shaft 352. A crank arm 353 pivotally secured to the bracket structure adjacent the upper end thereof is connected with an adjustment control 354 which may be selectively rotated in opposite directions (as viewed in FIGURE 5) to either displace the roller 350 toward or away from the peripheral surface of the assembly drum 74.

As shown best in FIGURE 4, the cylindrical surface 355 of the applicator roll is provided with a plurality of rib or ridges that are adapted to effectively engage the surface of a fastener strip 56 and deposit a plurality of adhesive stripes therealong in traversing relation with the end portions 59 and 60 of a handle 55 positioned along the strip. The spaces or gaps between such adhesive stripes deposited on the fastener strip by the roller 350 correspond to the spaces between such ribs or ridges along the surface 355 thereof. The adhesive stripes so laid down by the roller 350 are transversely spaced and are oriented with respect to the prior stripes deposited at the first adhesive-applying station 75 so as to be respectively interposed therebetween. As explained in connection with the adhesive applicator 75, the roller 350 is cyclically oscillated toward and away from the drum 74 to initiate and terminate the adhesive stripes in spaced relation with the ends of each fastener strip 56.

Thus, there is essentially no overlapping of the second group of stripes with the first group, and together they define an interlaced network effectively covering the entire width of each fastener strip 56 with adhesive. Moreover, the first group of adhesive stripes deposited upon the fastener strip 56 at the first adhesive-applying station 75 are effective to adhesively secure the handle 55 to the fastener strip. Further, since the second group of stripes laid down at the second adhesive-applying station 80 extends over the end portions 59 and 60 of the handle 55, the handle is thereby directly secured adhesively to the associated bag. Therefore, not only is the fastener strip 56 adhesively secured to the bag, but the handle 55 is adhesively secured both to the fastener strip and to the bag.

As the assembly drum 74 further advances the handle-equipped fastener strip and finally brings it into the position presently occupied by the fastener strip carried on the segment 86b (as shown in FIGURE 5), the vacuum or reduced pressure used to clamp the fastener strip to the segment adjacent the leading end thereof is released, and the tackiness of the adhesive then tends to cause the fastener strip 56 to adhere to the adjacent wall of a bag B against which it is pressed by the coaction of the assembly drum 74 and pressure roller 338. It is evident that the conveyor C, and particularly the rails 343 and 344 thereof, are disposed so as to be essentially tangent to the assembly drum 74 adjacent the pressure roller 338. Consequently, the path of movement of each bag B at this location is tangent to the drum (i.e., the peripheral surfaces of the segments 86a and 86b thereof), whereupon the handle-equipped fastener strip and bag are brought into contiguous relation as they both advance through this position.

Continued rotation of the drum finally causes the entire length of the fastener strip to be deposited along the bag, and the vacuum-clamp adjacent the trailing end of the segment 86b is released as such end portion of the segment approaches the pressure roller 338. In the event that the fastener strip tends to adhere to the surface of the drum segment, the stripper 131 shown in FIGURE 6 displaces the strip 56 therefrom. Quite evidently, the grooves 341 and 342 in the pressure roll 338 accommodate the rails 343 and 344 while permitting the cylindrical surface of the roller to be sufficiently elevated to urge a bag B upwardly against a fastener strip 56 being advanced by the assembly drum; and the conveyor belts 62 and 63 (FIGURE 1) serve to press the fastener strip and handle tightly against a bag to afford the adhesive time to set as the handle-equipped shopping bag is advanced to a discharge station.

*Operational summary*

A detailed cycle of operation of each of the main assemblies has been set forth heretofore as part of the individual descriptions thereof and, consequently, further description in complete detail of an overall operational cycle is not required for a complete understanding of the invention. However, for convenience, a general operational summary of the entire apparatus will now be presented.

As heretofore indicated, a stack 61 of bags or sacks are oriented adjacent the infeed of the apparatus and are advanced one by one onto the infeed conveyor C, and, in particular, are successively positioned in front of the respective flights 345 (FIGURE 9). Such successive delivery of bags to the conveyor can be done manually, but in the usual case will be accomplished by automatic feed mechanism which may be of conventional type such as a rotating pick-up arm or cylinder that repetitively engages the successive outermost bag in the stack 61 and advances each such bag onto the conveyor. Quite evidently, any such feed apparatus will be timed with the operation of the bag-handle machine and can be driven thereby.

The assembly drum 74 is driven continuously because of its connection (FIGURE 9) with the continuously driven main shaft 93 of the apparatus. As the assembly drum rotates, fastener strips 56 are successively laid along the two spaced apart segments 86a and 86b of the drum as the fastener strip feed rollers 83 and 84 are repetitively energized to successively withdraw lengths of tape or webbing 69 from the supply roll 70. Each such length is severed from the continuous length of tape by the cutter mechanism 72 and forms one of the fastener strips 56. Each length of webbing defining a fastener strip 56 is held or clamped to the peripheral surface of the associated drum segment 86 by vacuum means including the channel networks 130, and passages 129, 127 and 125 (or 128, 126 and 124) provided by the rotating assembly drum, and the flow systems 121, 120, 117, 116, 112 and 114 provided by the stationary manifold components (FIGURES 6, 9, 11 and 12) which are connected to an appropriate source of reduced pressure.

Subsequent to the deposition of each fastener strip 56 along a drum segment 86 and the clamping of the fastener strip thereto, it is advanced through a first adhesive-applying station 75 at which a plurality of transversely spaced adhesive stripes are laid along a surface of the fastener strip. Next, each fastener strip is advanced through the slack-producing station 76 at which the presser finger 90 rotates into engagement with the tape strip and depresses the same into an underlying recess 87. The loop of material thereby formed in the fastener strip is subsequently utilized when the fastener strip with a cord handle thereon is displaced into the bite of the gripper mechanisms 305 and 306. The presser finger 90 is provided with a plurality of transversely spaced ribs or extensions 91 (FIGURE 9) that actually engage the fastener strip, and such ribs are oriented so as to straddle the adhesive stripes laid along the fastener strip.

As tape is intermittently withdrawn from the parent roll 70, cut into fastener strip lengths and laid along the drum 74, then has adhesive applied thereto and thereafter has a slack-providing loop formed therealong, a handle 55 is being formed in the assembly 67. In this respect, the cord feed rollers 153 and 154 (FIGURES 15 and 19) are intermittently energized because of the connection of the drive roller 154 thereof with the continuously driven main shaft 93 through the gears 197 and 196, shaft 192 and continuously rotated cam 189 (FIGURE 14), the bell crank 180, reciprocable gear sector 172 and input gear 167 (FIGURE 21) of a one-way clutch 166 which provides an intermittently rotated output gear 164 that is connected to the drive roller 154 through a gear 163 and shaft 161 (FIGURE 15). Each time the drive roller 154 is energized, a length of cording 64 is withdrawn from the supply roll 65 and is advanced in one direction through the transfer drum 236 (FIGURE 25), then through the arcuate passage 303 in the forming die 227 and thereafter again passes through the transfer drum 236 but in the opposite direction.

As this advancement of the cord occurs, the transfer drum 236 is stationary and the forming die 237 is in its closed condition, as shown in FIGURE 5. Also at this time, the cord cutting assembly 68 is in its open position, as illustrated in FIGURE 23, and at about the instant that the cord feed roller 154 is de-energized, the cord severing mechanism 68 is actuated to displace the knife 208 thereof upwardly through the cord to sever the same into a handle length. The upper cut-off position of the assembly 68 is shown in FIGURE 18. The cord severing assembly is cyclically actuated because of its connection to the aforementioned continuously rotated cam 189 (FIGURE 14), which connection thereto includes the cam follower 235, yoke 229, push rod 228, drive link 226 and shaft 218 (FIGURES 21 and 22), and arm 217 and pin 216 (FIGURES 18, 19 and 23) the latter of which is slidably connected to the knife carrier 206.

Subsequent to such formation of a looped handle 55, the forming die 237 is opened to permit the handle to be indexed or advanced forwardly by the transfer drum 236. The forming die in the open position thereof is illustrated in FIGURE 18, and it is cyclically opened because of the driving connection of the upper and lower die sections 290 and 291 thereof with the shaft 218 which, as noted in connection with the cyclic actuation of the cord severing mechanism 268, is angularly reciprocated in accordance with the reciprocatory movement of the push rod 228. The push rod is reciprocated because of its connection to the cam 189 through the follower 235.

As shown in FIGURE 18, the upper die section 290 is pivoted upwardly into the open position thereof about a pivot axis defined by the shaft 225, and such movement is effected through the crank arm 299 which is affixed to the shaft 218, pin 298, link 297 and hinge element 293. The lower die section 291 is connected to the shaft 218 through the crank arm 299, link 220, pin 221, drive link 223 and hinge element 295 of the bell crank 224. Thus, the forming die 237 is opened concurrently with actuation of the cord severing assembly 68 and in terms of the cord drive, the die is closed when the drive is energized and is opened when the drive is deenergized.

As the forming die 237 is opened, or just subsequent thereto, the transfer drum 236 is energized to advance a looped handle 55 carried thereby into adjacency with the assembly drum 74 so that transfer of a handle thereto can be effected. The transfer drum 236 is intermittently actuated because of its driving connection to the geneva gearing assembly shown in FIGURE 13; and in a specific sense, the transfer drum is clamped to a shaft 241 (FIGURE 15) which has secured thereto the gear 281 and plate 282 of the driven component of the geneva assembly. The drive component thereof comprises the gear 271, plate 273, supports 275 and 276, and rollers 277-280, and it is secured to the main shaft 93 so as to be continuously rotated thereby.

The geneva drive assembly is timed with respect to the handle forming and fastener strip forming operations so that the transfer drum 236 is energized at about the time that the forming die 237 is fully opened and the handle 55 has been severed from the cording 64. As rotation of the transfer drum is initiated, the leading transfer holders 263 and 264 (FIGURES 6 through 8) are advanced out of contact wtih the cam bars 269 and 270, whereupon the transfer holders are displaced radially outwardly to confine therebetween the handle leg extending therethrough. However, almost immediately the holders 263 and 264 rotate into engagement with the peripheral surface of the assembly drum 74, and the spacing of the transfer drum and assembly drum is such that the transfer holders are depressed inwardly by the assembly drum and into the position shown in FIGURE 8.

At this time, the leading gripper mechanism 305 has been opened and has advanced into alignment with the cord 55; and the outermost surface of the central radial extension 284 of a transfer block 251 is located so that it depresses a leg of the cord 55 and underlying portion of the fastener strip 56 into the open jaws of the gripper mechanism 305.

As the assembly drum continues to rotate, the gripper mechanism closes to securely clamp the cord and fastener strip between the gear sections 307 and 308 which define the jaws of such gripper mechanism. Further continued rotation of the assembly drum 74 and transfer drum 236 advances the trailing gripper mechanism 306 into alignment with the next transfer assembly, whereupon the second leg of the handle 55 and underlying portion of the fastener strip are displaced into the jaws of such trailing gripper mechanism.

Each of the gripper mechanisms cyclically opens and closes in accordance with the rotational movement of the assembly drum 74; and in an operational sequence, each gripper mechanism is opened as the assembly drum rotates the same into general alignment with the transfer drum so that a juxtapositioned handle and fastener strip can be displaced thereinto. The gripper mechanism is then closed to positively grip such handle and fastener strip as the assembly drum advances the same toward a bag which is to receive such handle and strip. Next, the gripper mechanism is again opened so as to release the handle and fastener strip and permit the same to be secured to an underlying bag. Finally, further rotation of the drum 74 results in the gripper mechanism again being closed.

Such opening and closing movements of each gripper mechanism 305 and 306 are enforced thereon by the stationary cam elements 329 and 330 (FIGURE 10) because of the operative connection of the jaw-defining gear sections 307 and 308 with such cams during certain portions of the rotational movement of the assembly drum 74. More especially, the internal cam surfaces of the cams 329 and 330 are adapted to be selectively traversed by the roller 328 of each cam follower 327. Each cam follower is rigidly connected to an associated shaft 324 (FIGURES 9 and 10) which also has rigidly secured thereto a driver arm 323 (FIGURES 6, 7 and 9) equipped with a post 333 connected with the reciprocable driver pin 320. The pin 320 is connected through the drive bar 335 with the reciprocable rack gears 310 and 311 which respectively control the position of the jaw-defining gear sections 307 and 308. Therefore, in accordance with the cam configurations (also in accordance with whether the cam follower 327 is traversing such cams or is at a location intermediate the same), the gear sections 307 and 308 are in either the closed position thereof illustrated in FIGURE 6, or the open position thereof shown in FIGURES 7 and 8.

As the handle-equipped fastener strip is advanced by the assembly drum 74 from adjacency with the transfer drum 236, such strip passes through a second adhesive applying station 80 at which an additional plurality of adhesive stripes are deposited along the surface of the fastener strip in alternate interlaced relation with the prior applied stripes. As a result of the first and second groups of adhesive stripes respectively deposited at the first adhesive applying station 75 and at the second adhesive applying station 80, substantially the entire surface of the handle-equipped fastener strip is coated with adhesive. Moreover, a significant quantity of adhesive is also present along the handle 55 so that subsequently, it will be directly fastened adhesively to a bag as well as being directly fastened to the fastener strip.

After passing through the second adhesive applying station, the handle-equipped fastener strip 56 is advanced by the assembly drum 74 into the position illustrated in FIGURE 5. As the fastener strip is moved toward this position, the vacuum present in the channel network 130 at the leading end of the segment 86 is released because the opening 124 (FIGURE 6) is rotated into communication with the exhaust port 132. Release of the vacuum clamp occurs at about the instant that the leading end of the fastener strip 56 is brought into tangential relation with a bag B, whereupon the tackiness of the adhesive tends to adhere the fastener strip to the bag. Additionally, the stripper 131 (FIGURE 6) riding in the grooves 348 and 349 (FIGURE 12) of the assembly drum positively displaces the fastener strip from the surface of the drum and toward the underlying bag.

The presser roll 338 cooperates in effecting an adhesive bond between the fastener strip and bag in that it presses the bag upwardly into firm abutment with the peripheral surface of the drum segment 86. Quite evidently, the leading gripper mechanism is open, as heretofore described, at the time the drum 74 has advanced the same into the lowermost position illustrated in FIGURE 5 so that the fastener strip and handle leg can be withdrawn therefrom. As the trailing gripper mechanism is advanced toward the presser roll 338, the gear sections 307 and 308 of such mechanism are opened to permit the associated fastener strip and handle leg to be withdrawn therefrom, and the vacuum clamp adjacent the trailing end of the segments 86 is also released because the opening 325 associated with such end is brought into communication with the exhaust port 322 which relieves the channel network 130 of reduced pressure therein.

As the bag B with the handle 55 now secured thereto is additionally advanced by the adjacent flight 345 of the conveyor C, the open end portion of the bag passes into the grip of the conveyor belts 62 and 63 (FIGURE 1) which applies sufficient compressive force against the bag and handle-equipped fastener strip thereon to hold the same in firm abutment as the adhesive sets. The completed grocery bag is then advanced by the conveyor C and endless belts 62 and 63 to a discharge station at which the bags may be collated into groups of appropriate number, assembled into bundles, banded, and/or wrapped preparatory to storage and subsequent shipment.

As explained hereinbefore, with respect to the present invention the apparatus is esesntially symmetrical in a functional sense above and below a horizontal plane extending through the apparatus intermediate the contiguous stretches of the conveyor belts 62 and 63. Consequently, the upper handle-forming mechanism H, fastener-forming mechanism F and assembly mechanism A are effectively duplicated in the lower mechanisms H', F', and A' (FIGURE 1). Therefore, two fastener strips and two looped handles are formed concurrently in the apparatus, and the respectively associated handle and fastener strip elements are brought together and are then assembled with a bag B along the opposite side walls 50 and 51 thereof. Therefore, each bag B when discharged from the apparatus is a completed shopping bag, such as shown in FIGURE 3, equipped with two looped handles 54 and 55. The lower mechanism H', F', and A' of the apparatus respectively corresponds in a structural sense as well as in a functional sense to the upper mechanisms H, F and A and, therefore, the prior detailed descriptions of such mechanisms apply equally thereto.

A number of individual adjustments are provided in the apparatus as described in detail heretofore. Thus, and for summary purposes, it is sufficient at this point to simply mention such adjustments. Accordingly, it may be noted that the precise location of the transfer drum 236 relative to the forming die 237 can be infinitely adjusted through the wedge mounting of the drum on the shaft 241 (FIGURE 15) as defined by the elements 243–248 in order to obtain an accurate alignment of the openings through the drum (i.e., the space defined between the outer ends of the transfer holders 263 and 264) with the passage 303 in the forming die and with the guide 199 and passage 211 (FIGURE 23). The precise length of the handle 55 is determined by the period for which the cord feed rollers 153 and 154 are energized, and such period may be altered by adjusting the throw or stroke of the gear sector 72 by appropriate adjustment of the screw 181 (FIGURE 21). The magnitude of the resilient grip defined between the cord feed rollers 153 and 154 is determined by the position of the adjusting screw 157 (FIGURE 20). Timing of the opening and closing movements of the gripper mechanisms 305 and 306 can be varied by shifting the location of each cam element 329 and 330 (FIGURE 10) within the limits established by the elongated slots 332 therein. Also, the precise angular orientation of the drum 74 relative to the main drive shaft 93 can be adjusted within the limits defined by the elongated slots 108 (FIGURE 10).

While in the foregoing specification an embodiment of the invention has been set forth in considerable detail for purposes of making an adequate disclosure thereof, it will be apparent to those skilled in the art that numerous changes may be made in the details without departing from the spirit and principles of the invention.

What is claimed is:

1. In a method of equipping a bag with handles in making a shopping bag, the steps of withdrawing from a supply roll a predetermined length of cording and concurrently therewith forming such length into a loop-shaped handle, severing such handle from the cording supply, forming a fastener strip of predetermined length and deforming the same to form a slack-providing loop therealong, securing such handle to said fastener strip along areas thereof overlaid by such handle and deforming such overlaid areas to form from the material comprised by such slack-providing loop a pair of channels respectively receiving the overlying portions of such handle therein, advancing the handle-equipped fastener strip into an assembly station, advancing a bag into such assembly station in timed relation with the arrival of the handle-equipped fastener strip thereat, and assembling the handle and the fastener strip with such bag.

2. In a method of equipping bags with handles in making shopping bags, the steps of intermittently withdrawing from a supply roll successive predetermined lengths of cording and concurrently therewith forming each such length into a loop-shaped handle, severing each such handle from the cording supply, successively forming a plurality of fastener strips of predetermined length and deforming the same to form a slack-providing loop therealong, securing each such handle to a fastener strip along areas thereof overlaid by such handle and deforming such overlaid areas to form from the material comprised by such slack-providing loop a pair of channels respectively receiving the overlying portions of such handle therein, advancing each handle-equipped fastener strip into an assembly station, advancing a bag into such assembly station in timed relation with the arrival of each handle-equipped fastener strip thereat, and assembling the handle and fastener strip with such bag.

3. In a method of equipping a bag with handles in making a shopping bag, the steps of withdrawing from a supply roll a predetermined length of cording and concurrently therewith forming such length into a loop-shaped handle, severing such handle from the cording supply, forming a fastener strip of predetermined length and applying adhesive to a surface thereof deforming the fastener strip to form a slack-providing loop therealong, applying such handle to the adhesive-prepared surface of the fastener strip to secure the handle thereto along areas thereof overlaid by such handle and deforming such overlaid areas to form from the material comprised by such slack-providing loop a pair of channels respectively receiving the overlying portions of such handle therein, advancing the handle-equipped fastener strip into an assembly station, advancing a bag into such assembly station in timed relation with the arrival of the handle-equipped fastener strip thereat, and applying the handle-equipped surface of said fastener strip to such bag to adhesively secure the handle and fastener strip thereto.

4. In a method of equipping bags with handles in making shopping bags, the steps of intermittently withdrawing from a supply roll successive predetermined lengths of cording and concurrently therewith forming each such length into a loop-shaped handle, severing each such handle from the cording supply, successively forming a plurality of fastener strips of predetermined length and applying adhesive to a surface of each, deforming each such fastener strip to form a slack-providing loop therealong, applying each such handle to the adhesive-prepared surface of a fastener strip to secure the handle thereto along areas thereof overlaid by such handle and deforming such overlaid areas to form from the material comprised by such slack-providing loop a pair of channels respectively receiving the overlying portions of such handle therein, advancing each handle-equipped fastener strip into an assembly station, advancing a bag into such assembly station in timed relation with the arrival of each handle-equipped fastener strip thereat, and applying the handle-equipped surface of each fastener strip to such bag to adhesively secure the handle and fasteners strip thereto.

5. In a method of equipping bags with handles in making shopping bags, the steps of intermittently withdrawing from a supply roll successive predetermined lengths of cording and concurrently therewith forming each such length into a loop-shaped handle, severing each such handle from the cording supply, successively forming a plurality of fastener strips of predetermined length and applying adhesive to a surface of each, deforming each such fastener strip to form a slack-providing loop therealong, applying each such handle to the adhesive-prepared surface of a fastener strip to secure the handle thereto, along areas thereof overlaid by such handle and deforming such overlaid areas to form from the material comprised by such slack-providing loop a pair of channels respectively receiving the overlying portions of such handle therein, thereafter applying additional adhesive to the adhesive-prepared surface of each fastener strip and juxtaposed portions of the associated handle, advancing each handle-equipped fastener strip into an assembly station, advancing a bag into such assembly station in timed relation with the arrival of each handle-equipped fastener strip thereat, and applying the handle-equipped surface of each fastener strip to such bag to adhesively secure the handle and fastener strip thereto.

6. In a method of equipping bags wtih handles in making shopping bags, the steps of withdrawing webbing from a supply roll thereof and cutting such webbing into predetermined lengths to form fastener strips, deforming each fastener strip transversely intermediate the ends thereof to form a slack-providing loop therealong, withdrawing cording from a supply roll thereof and forming predetermined lengths of such cording into loop-shaped handles and severing each handle from the cording supply, applying each handle to a fastener strip with the free end portions of the loop-shaped handle extending transversely thereof and deforming such fastener strip along the areas thereof traversed by the handle end portions to form from the material comprised by such slack-providing loop a pair of channels respectively receiving such end portions of the handle therein, advancing each handle-equipped fastener strip into an assembly station, advancing a bag into such assembly station in timed relation with the arrival of each handle-equipped fastener strip thereat, and assembling each handle-equipped fastener strip with such bag.

7. In a method of equipping bags with handles in making shopping bags, the steps of withdrawing webbing from a supply roll thereof and cutting such webbing into predetermined lengths to form fastener strips, applying adhesive to a surface of each successive fastener strip, deforming each fastener strip transversely intermediate the ends thereof to form a slack-providing loop therealong, withdrawing cording from a supply roll thereof and forming predetermined lengths of such cording into loop-shaped handles and severing each handle from the cording supply, applying each such handle to the adhesive-prepared surface of a fastener strip with the free end portions of the loop-shaped handle extending transversely thereof and deforming such fastener strip along the areas thereof traversed by the handle end portions to form from the material comprised by such slack-providing loop a pair of channels respectively receiving such end portions of the handle therein, thereafter applying additional adhesive to the adhesive-prepared surface of each fastener strip and juxtaposed portions of the associated handle, advancing each handle-equipped fastener strip into an assembly station, advancing a bag into such assembly station in timed relation with the arrival of each handle-equipped fastener strip thereat, and applying the handle-equipped surface of each fastener strip to such bag to adhesively secure the handle and fastener strip thereto.

8. In a method of equipping bags with handles in making shopping bags, the steps of withdrawing webbing from a supply roll thereof and cutting such webbing into predetermined lengths to form fastener strips, applying adhesive to a surface of each successive fastener strip, deforming each fastener strip transversely intermediate the ends thereof to form a slack-providing loop therealong, intermittently withdrawing from a supply roll successive predetermined lengths of cording and concurrently therewith forming each such length into a loop-shaped handle, severing each such handle from the cording supply, constraining each successive severed handle in such loop shape while advancing the same toward an assembly station and transferring each such handle to the adhesive-pepared surface of a fastener strip with the free end portions of the loop-shaped handle extending transversely thereof and deforming such fastener strip along the areas thereof traversed by the handle end portions to form from the material comprised by such slack-providing loop a pair of channels respectively receiving such end portions of the handle therein, advancing a bag into such assembly station in timed relation with the arrival of each handle-equipped fastener strip thereat, and applying the handle-equipped surface of each fastener strip to such bag to adhesively secure the handle and fastener strip thereto.

9. The method of claim 8, including the further step of controlling the application of adhesive to each fastener strip to provide an adhesive pattern comprising a plurality of spaced apart adhesive stripes.

10. The method of claim 9, including the further step of applying additional adhesive to the adhesive-prepared surface of each fastener strip and juxtaposed portions of the associated handle while controlling the additional application of adhesive to provide an additional adhesive pattern comprising a plurality of spaced apart adhesive stripes respectively interposed between the stripes of the prior pattern.

11. In a method of forming looped handles for application thereof to bags in making shopping bags, the steps of providing a forming die having a generally loop-shaped passage extending therethrough, intermittently withdrawing from a supply roll successive predetermined lengths of cording and concurrently therewith advancing each such length through said passage to form a loop-shaped handle, severing each such handle from the cording supply, opening said die following formation of each such handle to make the same available and then constraining each successive available handle in such loop shape while transferring the same from said die and into an assembly station for application to a bag.

12. The method of claim 11 in which the further step is included of securing each such loop-shaped handle to a fastener strip preparatory to applying the handle to such bag.

13. In a method of forming a looped handle for application thereof to a bag in making a shopping bag, the steps of providing a forming die having a generally loop-shaped passage extending therethrough, withdrawing from a supply roll a predetermined length of cording and concurrently therewith advancing such length through said passage to form a loop-shaped handle, severing such handle from the cording supply, and opening said die and transferring the handle into an assembly station while constraining the handle in such loop shape.

14. In apparatus for equipping a bag with handles in making a shopping bag, cord feed structure for withdrawing a predetermined length of cording from a supply roll, a handle former mechanism for forming each such length into a loop-shaped handle, a cord-severing assembly for severing such handle from the cording supply, means for providing a fastener strip of predetermined length, an assembly drum for receiving such fastener strip therealong for advancing the same into an assembly station for assembly thereat with a bag, said assembly drum being provided with clamping means for releasably securing such fastener strip thereto and being provided also with a pair of angularly spaced gripper mechanisms selectively movable between open and closed positions and being respectively adapted to receive therein a portion of such fastener strip and juxtaposed leg of such handle, a slack-providing mechanism for forming a slack loop in such fastener strip, and a transfer drum for transferring such handle from said handle former mechanism to said assembly drum and into such gripper mechanisms, the material necessary for displacement of the fastener strip portions into said gripper mechanisms being obtained from the slack loop.

15. The apparatus of claim 14 in which said slack-providing mechanism comprises a rotatable finger, and in which said assembly drum is provided with a recess underlying such fastener strip and into which the fastener strip is depressed by said rotatable finger to form the aforementioned slack loop, said apparatus further including drive means connected with each of said gripper mechanisms for opening and closing the same in accordance with the angular position of said assembly drum so as to accept the transfer of such handle from said transfer drum, then grip the handle to transfer the same into an assembly station and effect discharge of such handle for assembly thereof with a bag at such assembly station.

16. In apparatus for equipping a bag with handles in making a shopping bag, cord feed structure for withdrawing a predetermined length of cording from a supply roll, a handle former mechanism for forming each such length into a loop-shaped handle, a cord-severing assembly for severing such handle from the cording supply, means for providing a fastener strip of predetermined length, an assembly drum for receiving such fastener strip therealong for advancing the same into an assembly station for assembly thereat with a bag, said assembly drum being provided with clamping means for releasably securing such fastener strip thereto and being provided also with a pair of angularly spaced gripper mechanisms selectively movable between open and closed positions and being respectively adapted to receive therein a portion of such fastener strip and juxtaposed leg of such handle, a first adhesive applicator for depositing an adhesive along a surface of such fastener strip, a slack-providing mechanism for forming a slack loop in such fastener strip, and a transfer drum for transferring such handle from said handle former mechanism to said assembly drum and into such gripper mechanisms, the material necessary for displacement of the fastener strip portions into said gripper mechanisms being obtained from the slack loop and the adhesive deposited along such fastener strip being effective to adhesively secure such handle thereto.

17. The apparatus of claim 16 in which said first adhesive applicator includes an applicator roll having a plurality of transversely spaced ribs extending outwardly from the peripheral surface thereof and being operative to deposit along such fastener strip a plurality of transversely spaced adhesive stripes.

18. The apparatus of claim 17 in which said slack-providing mechanism is located subsequent to said first adhesive applicator along the path of movement described by such fastener strip and comprises a rotatable finger, and in which said assembly drum is provided with a recess underlying such fastener strip and into which the fastener strip is depressed by said rotatable finger to form the aforementioned slack loop.

19. The apparatus of claim 18 in which said rotatable finger is provided with a plurality of transversely spaced projections separated by a plurality of depressions, said depressions being respectively aligned by the ribs of said first adhesive applicator roll so that said projections engage such fastener strip intermediate the adhesive stripes deposited therealong by said first adhesive applicator.

20. The apparatus of claim 16 and further comprising a second adhesive applicator for depositing additional adhesive along the adhesive-prepared surface of such fastener strip and a handle supported in juxtaposed relation therewith.

21. The apparatus of claim 20 in which said first and said second adhesive applicators each includes an adhesive applicator roll having a plurality of transversely spaced ribs extending outwardly from the peripheral surface thereof and being operative to deposit along such fastener strip a plurality of transversely spaced adhesive stripes, the ribs on the respective applicator rolls being transversely offset relative to each other so that the stripes deposited by the roll of said second adhesive applicator are respectively interposed between the stripes deposited by the first adhesive applicator.

22. In apparatus for equipping bags with handles in making shopping bags, cord feed structure for intermittently withdrawing successive predetermined lengths of cording from a supply roll, a handle-forming die having a loop-shaped passage therein for guiding each such length of cording therethrough for forming the same into a loop-shaped handle and comprising a pair of die sections selectively movable between open and closed positions, actuating mechanism for cyclically opening said die sections to permit each such handle to be displaced therefrom, a cord-severing assembly for severing each such handle from the cording supply and including actuating means operative in a time relationship with said actuating mechanism to so sever each such handle prior to the opening of said die sections and displacement of a handle therefrom, means for intermittently providing successive fastener strips of predetermined length, a rotatably driven assembly drum for receiving successive fastener strips and advancing each such fastener strip into an assembly station for the respective assembly thereat with a bag, said assembly drum being provided with clamping means for releasably securing each successive fastener strip at a predetermined location along said drum and being provided with a pair of angularly spaced gripper mechanisms disposed in underlying relation with a fastener strip secured to said drum and being selectively movable between open and closed positions and being adapted to receive therein a portion of such fastener strip and a leg of a handle disposed in juxtaposition therewith, drive means connected with each of said gripper mechanisms for opening and closing the same in accordance with the angular position of said assembly drum, a rotatable transfer drum for transferring each such handle from said handle-forming die to said assembly drum in juxtaposed relation with a fastener strip therealong and into said gripper mechanisms, and drive means for intermittently rotating said transfer drum in timed relation with the rotational movement of said assembly drum and opening of said forming die to transfer each successive handle to said assembly drum in juxtaposed relation with a fastener strip carried thereby.

23. The apparatus of claim 22 and further comprising a rotatably driven slack-providing mechanism including a rotatable finger, and in which said assembly drum is provided with a recess underlying such fastener strip and into which it is depressed by said rotatable finger to form a slack loop in such fastener strip from which the material necessary for displacement of the fastener strip portions into said gripper mechanism is obtained.

24. The apparatus of claim 23 in which glue applicator mechanism is provided for depositing adhesive along each such fastener strip for securing the same to a bag.

25. The apparatus of claim 24 and further comprising cord feed and cord size detection means through which such cording must pass in being advanced to said forming die for sensing a relatively long interruption in the intermittent advancement of such cording and also for sensing an enlargement exceeding a predetermined dimension in the transverse size of the cording.

26. The apparatus of claim 24 in which said die sections are pivotally supported for generally concurrent angular displacements in opposite directions to selectively open or close the forming die, and in which said actuating mechanism for cyclically opening said die sections includes differential linkage for angularly displacing one of said die sections through an arc of greater length than the other to provide adequate clearance for the displacement of a handle from said forming die upon actuation of said transfer drum.

27. The apparatus according to claim 26 in which said passage is generally U-shaped in cross section and is formed substantially entirely within the aforesaid one die section.

28. The apparatus according to claim 24 in which each of said gripper mechanisms includes a pair of jaw-defining gear sections concurrently movable in opposite directions toward and away from each other to selectively open and close the associated gripper mechanism, a pair of rack gears respectively connected with said gear sections for displacing the same between the open and closed positions thereof, a reciprocable drive pin connected with said rack gears for moving the same to so open and close said gear sections, cam follower mechanism connected with said drive pin for reciprocating the same, and cam structure traversed by said cam follower mechanism upon rotation of said assembly drum to effect the aforementioned opening and closing movements of each of said gripper mechanisms in accordance with the angular position of said assembly drum.

29. The apparatus according to claim 24 in which said transfer drum comprises a pair of angularly spaced transfer devices respectively alignable with the opposite ends of said passage to enable each such length of cording to pass through the transfer devices and passage in forming a loop-shaped handle, each of said transfer devices including a pair of transfer holders resiliently biased toward a handle-confining position, and in which said apparatus further comprises displacement means engageable with said transfer holders when the same are aligned with said passage for displacing such transfer holders from the handle-confining positions thereof to enable each such handle to pass therethrough.

30. The apparatus of claim 29 in which said transfer drum is oriented with respect to said assembly drum so that said transfer holders engage the peripheral surface of the assembly drum in transferring a handle thereto so that the transfer holders are displaced from the handle-confining positions thereof to enable each such handle to be displaced into the jaws of said gripper mechanisms.

31. The apparatus according to claim 24 in which said clamping means comprises vacuum suction means selectively operable in accordance with the angular position of said assembly drum to clamp each such fastener strip thereon during transfer thereof into such assembly station and to release such fastener strip thereat.

32. The apparatus according to claim 31 in which said vacuum suction means includes a stationary manifold for connection to a source of reduced pressure, a channel network provided in the surface of said assembly drum in underlying relation with such fastener strip, and flow passage means provided by said assembly drum in communication with said channel network, said flow passage means being selectively rotated into and out of flow communication with said manifold in accordance with the angular position of said assembly drum to so clamp and release each fastener strip.

33. The apparatus of claim 32 in which said manifold is provided with exhaust port means adjacent said assembly station for communication with said passage means thereat.

34. In a mechanism for forming loop-shaped handles for application to a bag to make a shopping bag therefrom, a pair of feed rollers defining a cord-gripping nip therebetween and being operative to intermittently withdraw successive predetermined lengths of cording from a supply roll, drive means connected with at least one of said rollers for intermittently rotating the same, a handle-forming die having a loop-shaped passage therein for guiding each such length of cording therethrough for forming the same into a loop-shaped handle and comprising a pair of die sections selectively movable between open and closed positions, actuating mechanism for cyclically opening said die sections to permit each such handle to be displaced therefrom, a rotatable transfer drum interposed between said forming die and feed rollers for advancing each such handle from said forming die and including a pair of angularly spaced transfer devices respectively alignable with the opposite ends of said passage to enable each such length of cording to pass through the transfer devices and passage in forming a loop-shaped handle, each of said transfer devices including a pair of transfer holders resiliently biased toward a handle-confining position but being displaceable therefrom to enable each such length of cording to move therebetween in passing through said transfer devices and passage, drive means for intermittently rotating said transfer drum in timed relation with the opening of said forming die to advance each successive handle therefrom, displacement means engageable with said transfer holders when the same are aligned with said passage for displacing the transfer holders from the handle-confining positions thereof, and a cord-severing assembly interposed between said feed rollers and transfer drum for severing each such handle from the cording supply and including actuating means operative in a time relationship with said actuating mechanism so as to sever each such handle prior to the opening of said die sections and displacement of a handle therefrom by said transfer drum.

35. The mechanism of claim 34 in which said transfer holders are resiliently biased radially outwardly at their outer ends, and in which said displacement means comprises at least one stationary cam bar traversed by said transfer holders at the outer ends thereof and being oriented and configurated so as to displace the transfer holders in engagement therewith radially inwardly.

36. The mechanism of claim 34 in which said die sections are pivotally supported for generally concurrent angular displacements about a common axis and in opposite directions to selectively open or close the forming die.

37. The mechanism of claim 36 in which said forming die is transversely oriented with respect to said transfer drum, and in which said actuating mechanism for cyclically opening said die sections includes differential linkage for angularly displacing one of said die sections through an arc of greater length than the other to provide adequate clearance for the displacement of a handle from said forming die upon actuation of said transfer drum.

38. In apparatus for equipping a bag with handles in making a shopping bag, cord feed structure for withdrawing a predetermined length of cording from a supply roll, a handle former mechanism for forming each such length into a loop-shaped handle and comprising a forming die having a loop-shaped passage therein for guiding each such length of cording therethrough, a cord-severing assembly for severing each such handle from the cording supply, an assembly drum for advancing each such handle into an assembly station for assembly thereat with a bag, a transfer drum for transferring each such handle from said handle former mechanism to said assembly drum, said forming die comprising a pair of die sections selectively movable between open and closed positions for guiding when in its closed position a length of cording through said passage and for enabling when in its open position said transfer drum to transfer a loop-shaped handle to said assembly drum, and actuating mechanism for cyclically opening and closing said die sections.

39. The apparatus of claim 38 in which said cord-severing assembly includes a reciprocable knife selectively movable from an open position and across the path traversed by such length of cording, and in which said apparatus further comprises actuating means connected with said knife for cyclically reciprocating the same to sever each such handle from the cording supply.

40. The apparatus of claim 39 in which resilient biasing means are included in said cord-severing assembly for resiliently biasing said knife into the open position thereof.

41. In apparatus for equipping a bag with handles in making a shopping bag, cord feed structure for withdrawing a predetermined length of cording from a supply roll, a handle former mechanism for forming each such length into a loop-shaped handle, a cord-severing assembly for severing each such handle from the cording supply, an assembly drum for advancing each such handle into an assembly station for assembly thereat with a bag, drive means connected with said assembly drum for rotating the same, a transfer drum for transferring each such handle from said handle former mechanism to said assembly drum, said assembly drum comprising a pair of angularly spaced gripper mechanisms selectively movable between open and closed positions and being respectively adapted to receive therein a leg of each such loop-shaped handle and drive means connected with each of said gripper mechanisms for opening and closing the same in accordance with the angular position of said assembly drum so as to accept the transfer of each such handle from said transfer drum, then grip the handle to transfer the same into an assembly station and then effect discharge of the handle for assembly thereof with a bag at such assembly station.

42. In apparatus for equipping a bag with handles in making a shopping bag, cord feed structure for withdrawing a predetermined length of cording from a supply roll, a handle former mechanism for forming each such length into a loop-shaped handle, a cord-severing assembly for severing each such handle from the cording supply, an assembly drum for advancing each such handle into an assembly station for assembly thereat with a bag, and a transfer drum for transferring each such handle from said handle former mechanism to said assembly drum and comprising a pair of angularly spaced transfer devices for respectively confining the legs of each such loop-shaped handle in effecting transfer thereof from such handle former mechanism to said assembly drum.

43. The apparatus of claim 42 in which each of said transfer devices comprises a pair of transfer holders resiliently biased toward a handle-confining position, and in which displacement means are provided for engagement with said transfer holders at the handle-receiving position thereof for displacing the holders against such resilient bias.

44. The apparatus of claim 43 in which intermittent drive means are provided for intermittently rotating said transfer drum to transfer each such handle from said handle former mechanism to said assembly drum.

45. In apparatus for equipping a bag with handles in making a shopping bag, cord feed structure for withdrawing a predetermined length of cording from a supply roll, a handle former mechanism for forming each such length into a loop-shaped handle and comprising a former die having a loop-shaped passage therein for guiding each such length of cording therethrough, a cord-severing assembly for severing each such handle from the cording supply, an assembly drum for advancing each such handle into an assembly station for assembly thereat with a bag, said forming die comprising a pair of die sections selectively movable between open and closed positions for guiding when in its closed position a length of cording through said passage and for enabling when in its open position said transfer drum to transfer a loop-shaped handle to said assembly drum, and actuating mechanism for cyclically opening and closing said die sections.

46. The apparatus of claim 45 in which said cord feed structure comprises a pair of feed rollers defining a cord gripping nip therebetween, and in which said apparatus further includes drive means connected with at least one of said rollers for rotating the same.

47. The apparatus of claim 46 in which adjustment means are provided in said apparatus for selectively varying the cord gripping nip defined by said rollers.

48. The apparatus of claim 45 and further comprising means for providing a fastener strip of predetermined length, said assembly drum being operative to receive such fastener strip therealong for advancing the same into such assembly station for assembly thereat with such a handle with a bag.

49. The apparatus of claim 48 in which said assembly drum is equipped with clamping means for releasably securing such fastener strip thereto.

50. The apparatus of claim 49 in which said clamping means comprises vacuum suction means selectively operable in accordance with the angular position of said assembly drum to clamp such fastener strip thereon during transfer thereof into such assembly station and to release such fastener strip thereat.

51. The apparatus of claim 50 and further comprising a transfer drum for transferring each such handle from said handle former mechanism to said assembly drum in juxtaposition with a fastener strip thereon.

52. An apparatus for equipping a bag with handles in making a shopping bag, cord feed structure for withdrawing a predetermined length of cording from a supply roll, a handle former mechanism for forming each such length into a loop-shaped handle and comprising a forming die having a loop-shaped passage therein for guiding each such length of cording therethrough, said forming die comprising a pair of die sections selectively movable between open and closed positions for guiding when in its closed position a length of cording through said passage and for enabling when in its open position such loop-shaped handle to be removed from said forming die, a cord-severing assembly for severing each such handle from the cording supply, means for providing a fastener strip of predetermined length, a slack-providing mechanism for forming a slack loop in such fastener strip, an assembly drum for receiving such fastener strip therealong to advance the same into an assembly station for assembly thereat with a bag, and a transfer drum for transferring each such handle from said handle former mechanism to said assembly drum and into juxtaposition with such fastener strip for assembly therewith to such bag.

53. In a method of equipping a bag with handles in making a shopping bag, the steps of providing a forming die having a generally loop-shaped passage extending therethrough, withdrawing from a supply roll a predetermined length of cording and advancing the same through said passage to form a loop-shaped handle, severing such handle from the cording supply, forming a fastener strip of predetermined length and deforming the same to form a slack-providing loop therealong, opening said die and transferring the handle therefrom and thereafter securing such handle to said fastener strip along areas thereof overlaid by such handle and deforming such overlaid areas to form from the material comprised by such slack-providing loop a pair of channels respectively receiving the overlying portions of such handle therein, and assembling the handle and fastener strip with such bag.

54. The method of claim 53 including the further step of applying adhesive to a surface of such fastener strip to enable the same to be adhesively secured to such bag.

References Cited

UNITED STATES PATENTS

| | | | |
|---|---|---|---|
| 2,689,506 | 9/1954 | Bagnall | 93—8 |
| 2,844,075 | 7/1958 | Davis et al. | 93—8 |
| 3,054,442 | 9/1962 | Atwood et al. | |

BERNARD STICKNEY, *Primary Examiner.*